(12) United States Patent
Volin

(10) Patent No.: US 9,955,631 B2
(45) Date of Patent: May 1, 2018

(54) UNIQUE EXTRUSION MANUFACTURING METHOD AND UNIQUE SOIL-PACKING GARDEN-SHAPING SYSTEM, HAVING ADJUSTABLE ELEVATION-GUIDING SYSTEM, IMPACT-ABSORBING SYSTEM, ADJUSTABLE PENETRATION-GUIDING SYSTEM, ADJUSTABLE BORDER-STRENGTHENING SYSTEM, AND SHAPE-HARDENING SYSTEM

(71) Applicant: Dee Volin, Fairview, OR (US)

(72) Inventor: Dee Volin, Fairview, OR (US)

( * ) Notice: Subject to any disclaimer, the term of this patent is extended or adjusted under 35 U.S.C. 154(b) by 188 days.

(21) Appl. No.: 14/724,157

(22) Filed: May 28, 2015

(65) Prior Publication Data

US 2015/0342124 A1    Dec. 3, 2015

Related U.S. Application Data

(60) Provisional application No. 62/006,051, filed on May 31, 2014.

(51) Int. Cl.
*A01G 1/00* (2006.01)
*A01G 1/08* (2006.01)

(52) U.S. Cl.
CPC ..................... *A01G 1/08* (2013.01)

(58) Field of Classification Search
CPC ...... A01G 1/08; A01G 9/122; F21V 21/0824; E04H 15/62; E04H 12/2215; E04H 15/32
USPC ............................................. 52/102; 135/118
See application file for complete search history.

(56) References Cited

U.S. PATENT DOCUMENTS

| | | | |
|---|---|---|---|
| 484,998 A * | 10/1892 | Comstock | ............... E04H 15/62 135/118 |
| 1,509,860 A | 9/1924 | Cannady | |
| 1,843,108 A | 2/1932 | Clayden | |
| 2,184,904 A | 12/1939 | Boehme | |
| 2,842,344 A | 7/1958 | Todd | |
| 3,378,949 A | 4/1968 | Dorris | |
| 3,387,786 A | 6/1968 | Rynberk | |
| 3,484,989 A | 12/1969 | Lazinsky | |
| 3,485,449 A | 12/1969 | Wilson | |
| 3,545,127 A | 12/1970 | Jensen | |
| 3,788,001 A | 1/1974 | Balfanz, Jr. | |

(Continued)

*Primary Examiner* — Kristen C Hayes

(57) ABSTRACT

A unique soil-packing garden-shaping system comprises soil-packing garden-shaping wavy partitions for absorbing hammering forces and for packing and holding garden soil, impact-absorbing-strip grooves pressure-molded on the sides of the wavy partitions, impact heads extrudedly molded to the top of the wavy partitions for receiving hammering forced thereon, curved directional heads extrudedly molded to the bottom of the wavy partitions for penetrating into the ground at adjustable angles, wavy-partition couplers for coupling the wavy partitions, and multiple different color-coded impact-absorbing strips of multiple different highly flexible materials pressure-extrudedly molded in the grooves for absorbing the hammering force exerted on the impact heads, for limiting the bending degree of the wavy partitions, for pushing the wavy partitions back after bending to prevent the wavy partitions from breaking, for guiding the elevations of the wavy partitions over garden soil, for gradually hardening to strengthen and secure the shape of the wavy partitions, and for building garden shapes, never possible before.

10 Claims, 25 Drawing Sheets

(56) References Cited

U.S. PATENT DOCUMENTS

| | | | |
|---|---|---|---|
| 3,933,311 A * | 1/1976 | Lemelson | B05B 1/18 239/276 |
| 4,281,473 A | 8/1981 | Emalfarb | |
| 4,321,769 A | 3/1982 | Tisbo | |
| 4,372,079 A | 2/1983 | Trageser | |
| 4,663,883 A | 5/1987 | Hilliard | |
| 4,831,776 A | 5/1989 | Fritch | |
| 5,157,867 A | 10/1992 | Fritch | |
| 5,205,090 A * | 4/1993 | Lavery | E04C 1/395 404/7 |
| 5,315,780 A | 5/1994 | Thomas | |
| 5,377,447 A | 1/1995 | Fritch | |
| 5,379,546 A | 1/1995 | Popp | |
| 5,531,044 A | 7/1996 | Wallenius | |
| 5,544,445 A | 8/1996 | Mantilla | |
| D416,339 S | 11/1999 | Shaw | |
| 6,253,486 B1 * | 7/2001 | Prassas | A01G 1/08 47/33 |
| 6,293,046 B1 | 9/2001 | Meglino | |
| 6,385,898 B1 | 5/2002 | Noel | |
| 6,386,517 B1 | 5/2002 | McNeill | |
| 6,449,897 B1 * | 9/2002 | Gaston | A01G 1/08 47/33 |
| 6,629,383 B2 | 10/2003 | Allen | |
| 6,643,977 B1 | 11/2003 | Drysdale | |
| D520,647 S | 5/2006 | Elmore | |
| 7,051,477 B2 | 5/2006 | Burnham | |
| D548,368 S * | 8/2007 | Hale | D25/121 |
| 7,331,147 B2 | 2/2008 | Kalisiak | |
| 7,526,892 B2 | 5/2009 | Saunders | |
| 7,555,863 B1 | 7/2009 | Caldwell | |
| 7,596,903 B1 | 10/2009 | Flanagan | |
| D612,072 S * | 3/2010 | Keeley | D25/121 |
| 7,669,365 B2 | 3/2010 | Olink | |
| 7,810,277 B2 | 10/2010 | Fakhari | |
| 8,282,311 B2 | 10/2012 | Chow | |
| 8,354,048 B2 | 1/2013 | Caceres | |
| 8,407,948 B1 | 4/2013 | Nash | |
| 8,528,249 B1 | 9/2013 | Kao | |
| 8,832,995 B2 | 9/2014 | Kalamaris | |
| 8,956,139 B2 | 2/2015 | Adam | |
| 9,313,956 B2 * | 4/2016 | Volin | A01G 1/08 |
| 2005/0034362 A1 | 2/2005 | Anderson | |
| 2005/0055876 A1 | 3/2005 | Solis | |
| 2005/0252101 A1 | 11/2005 | Anderson | |
| 2008/0053005 A1 * | 3/2008 | Wilson | A01G 1/08 52/102 |
| 2012/0174479 A1 | 7/2012 | Leiter | |
| 2013/0219784 A1 * | 8/2013 | Larsen | A01G 1/08 47/33 |
| 2014/0208644 A1 * | 7/2014 | Volin | A01G 1/08 47/33 |
| 2014/0290132 A1 * | 10/2014 | Bent | A01G 1/08 47/33 |

* cited by examiner

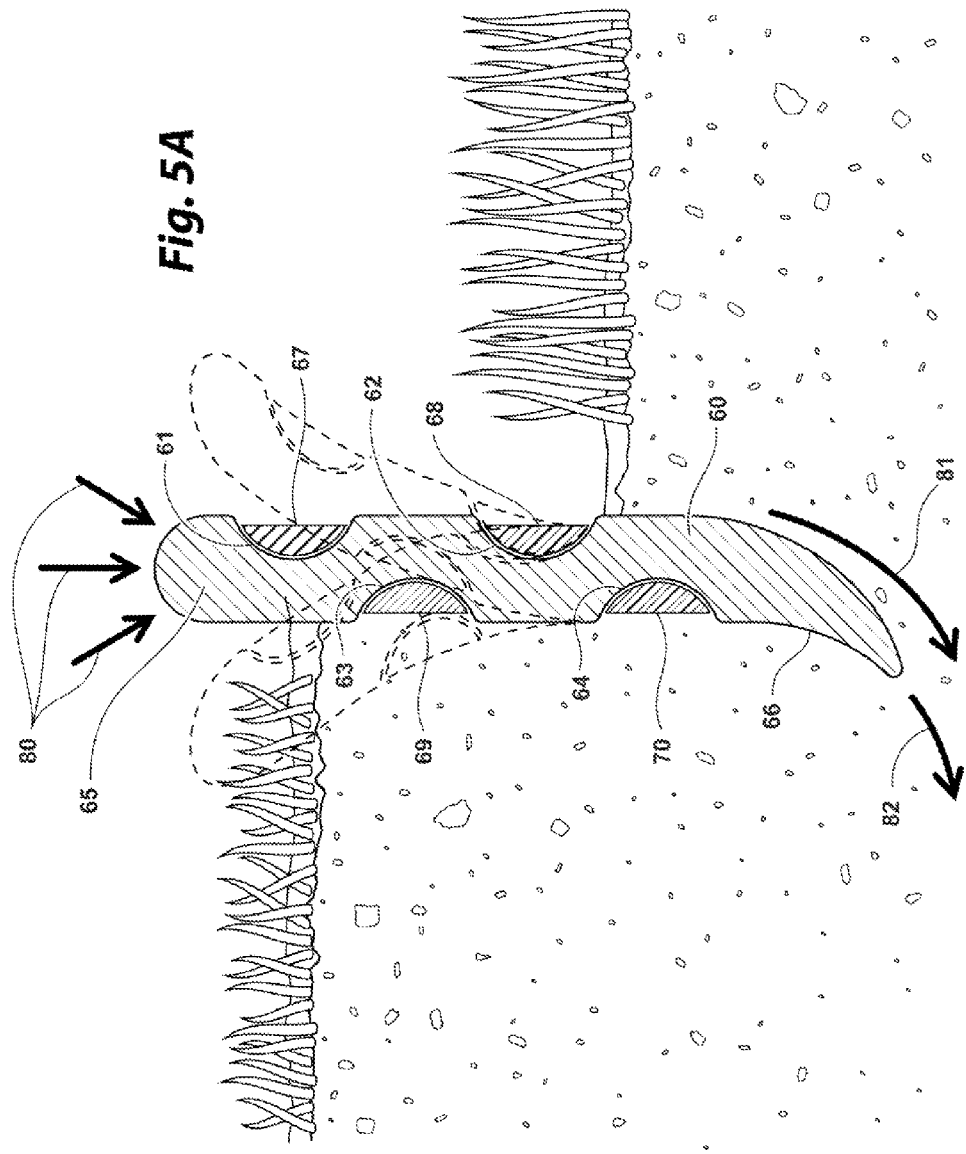

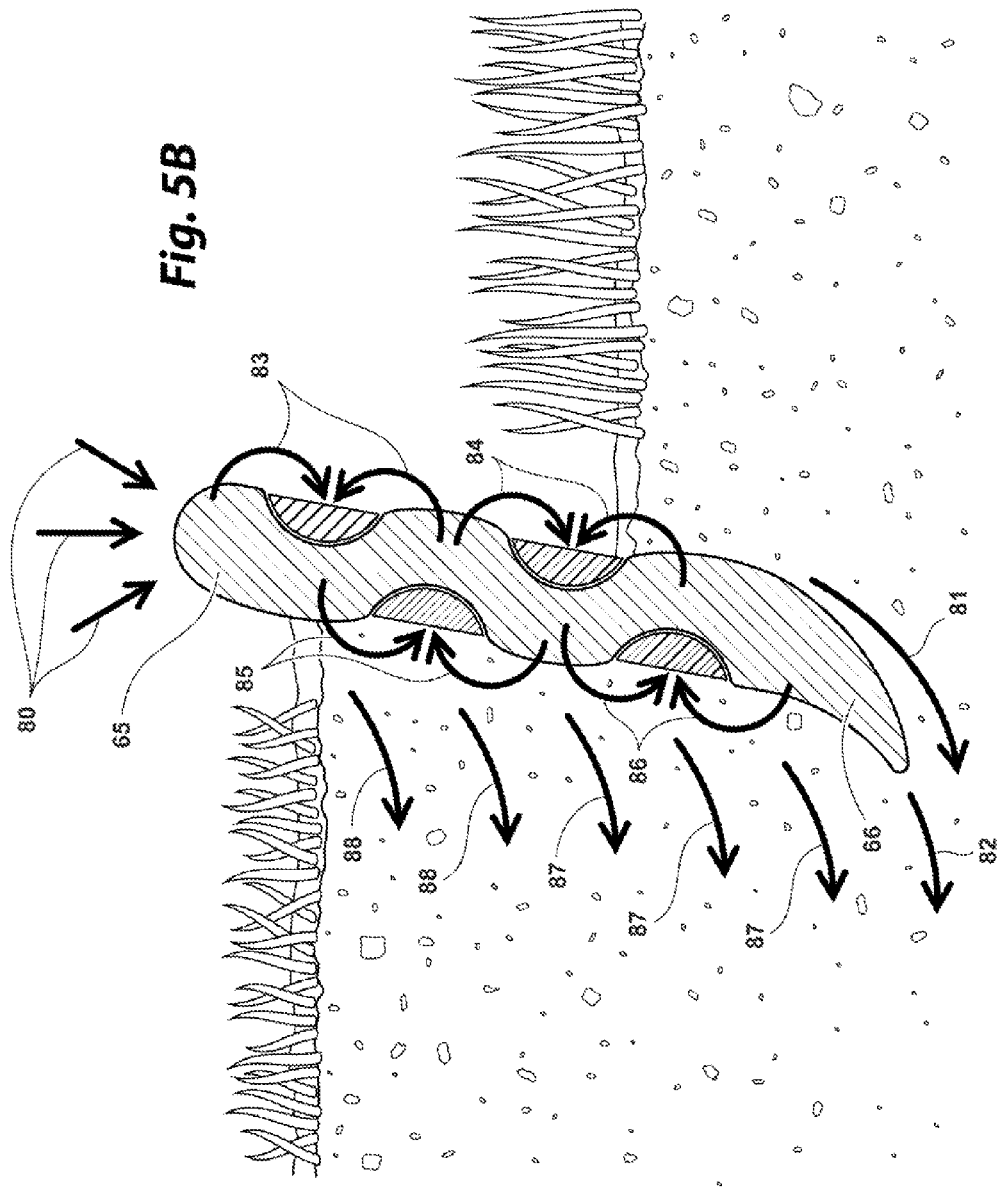

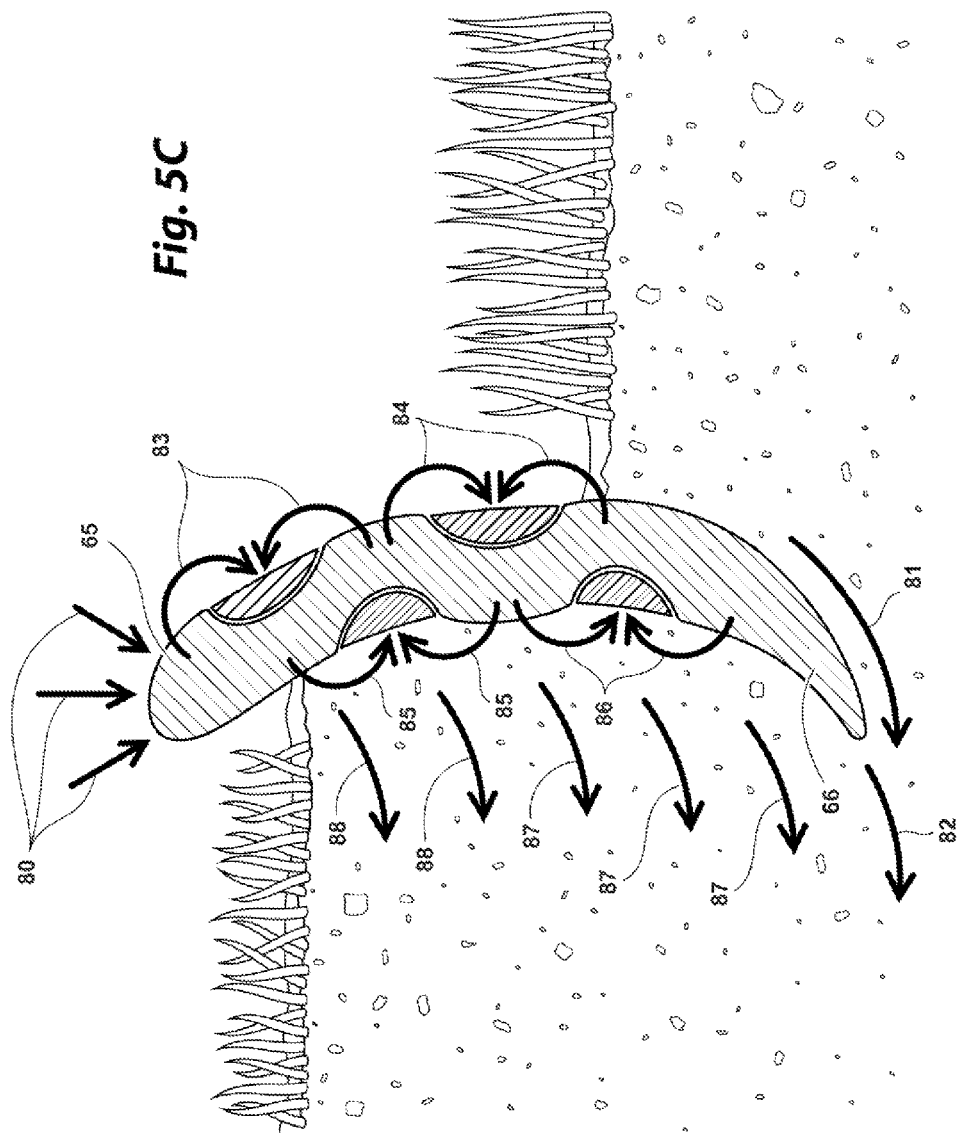

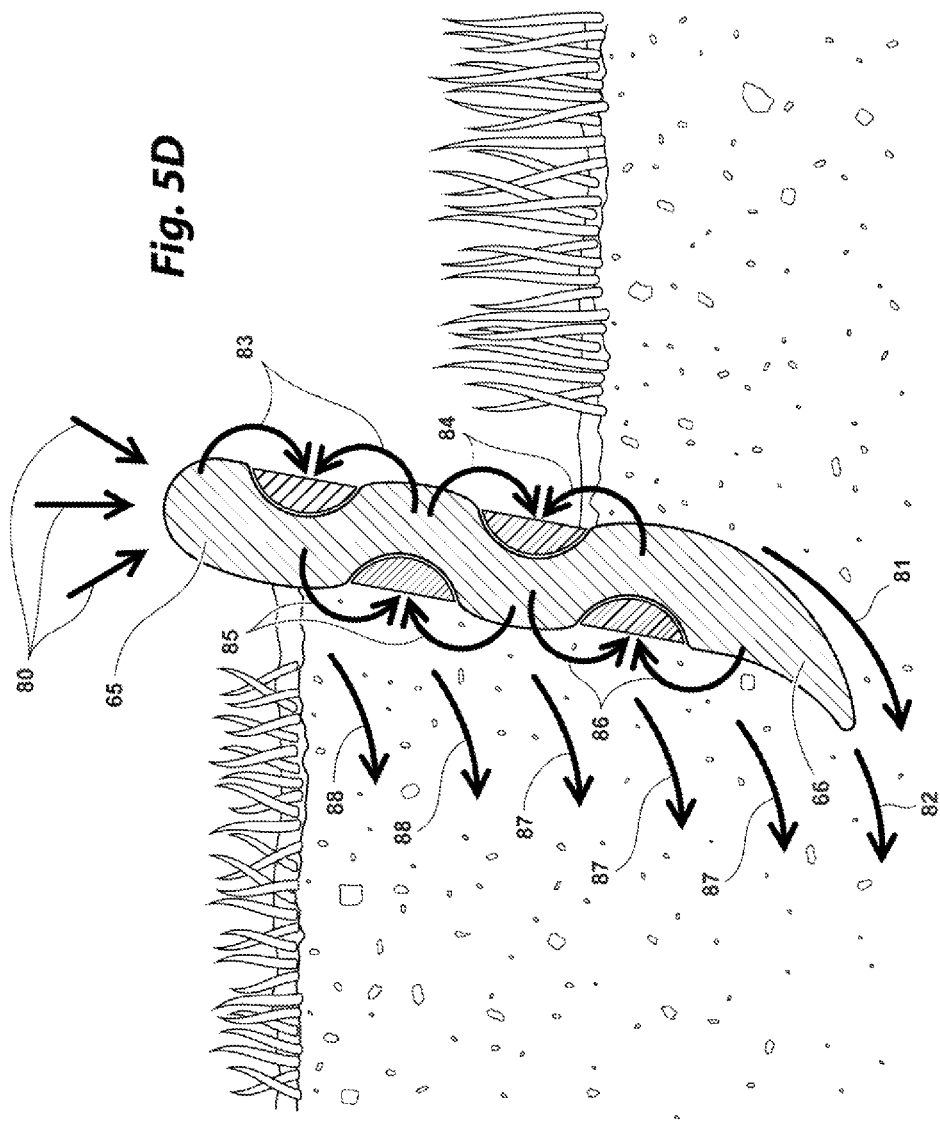

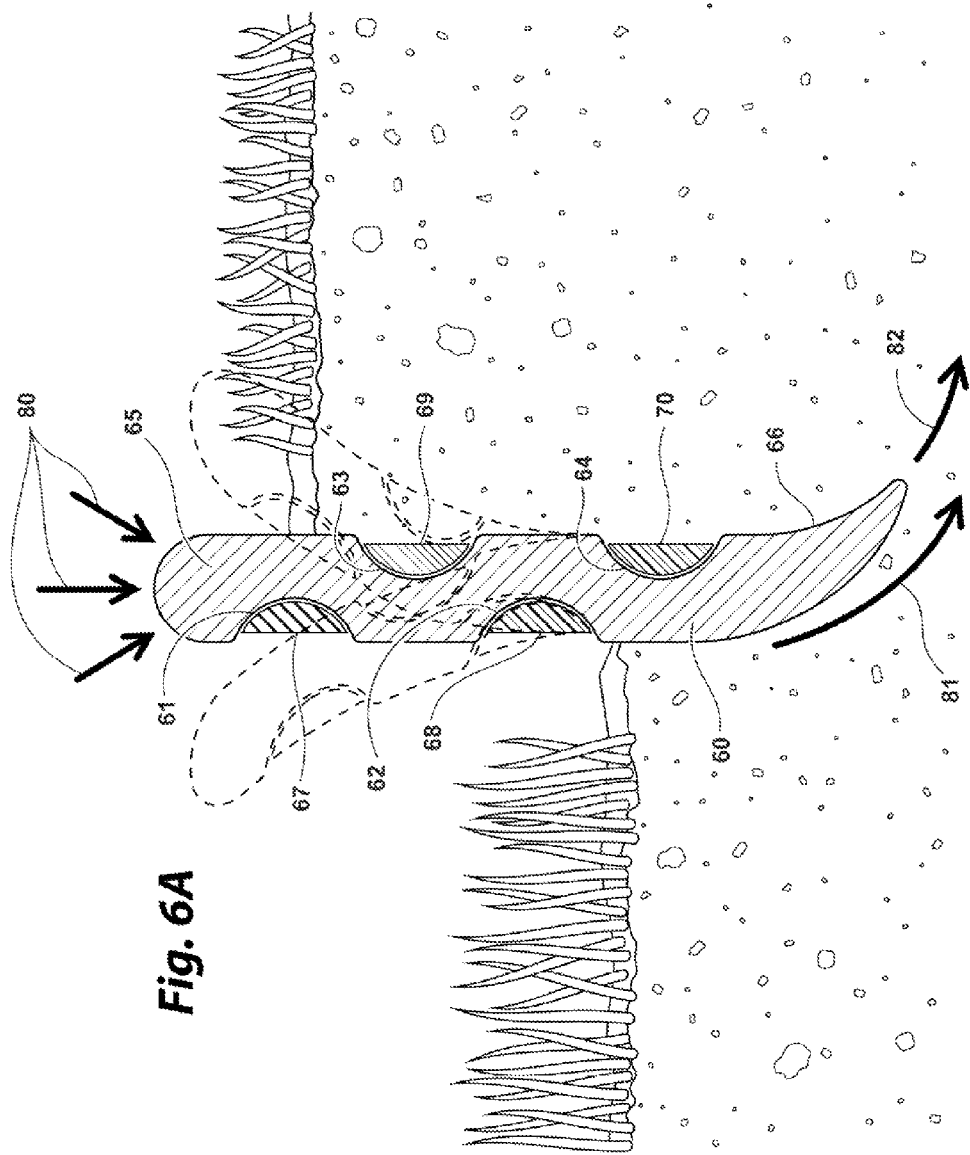

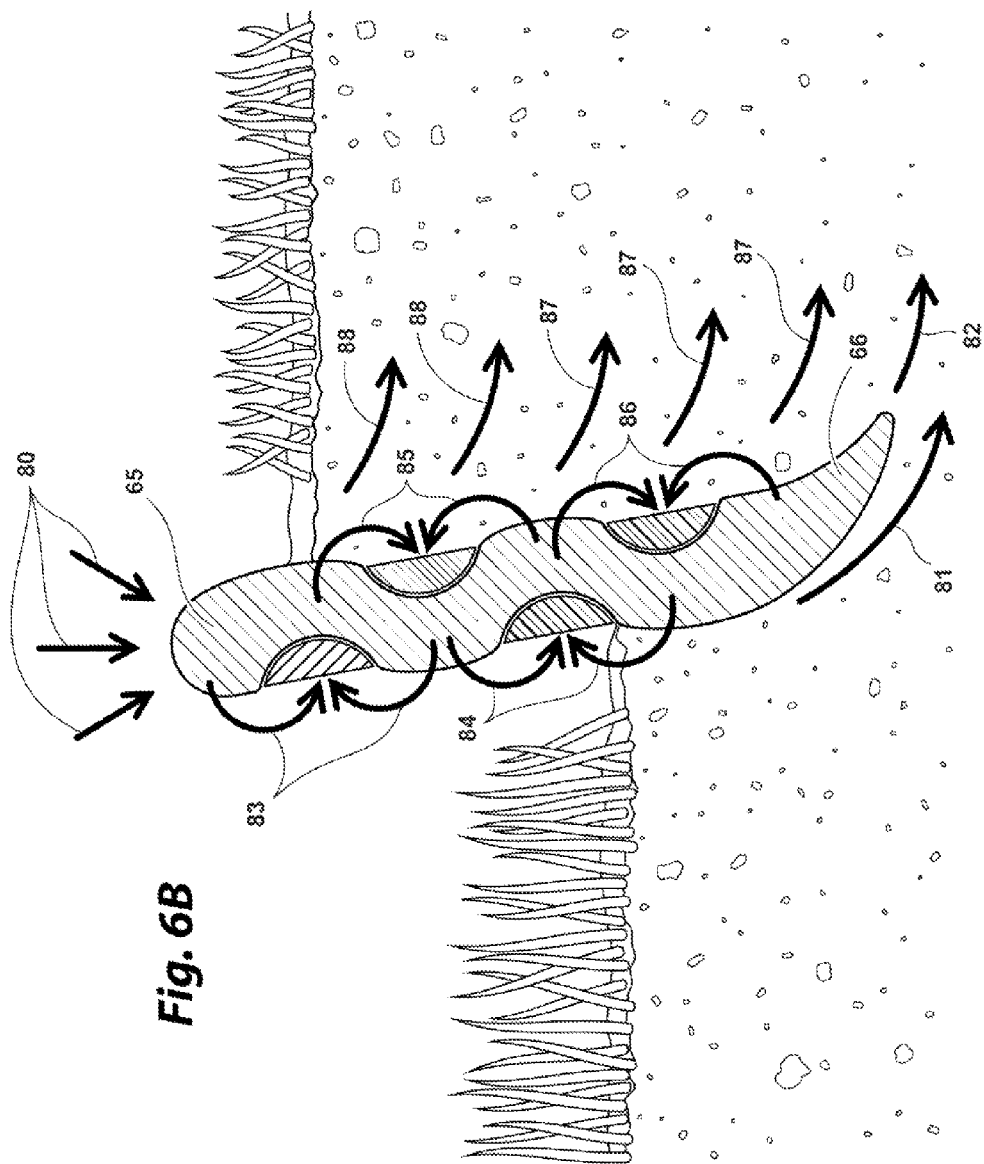

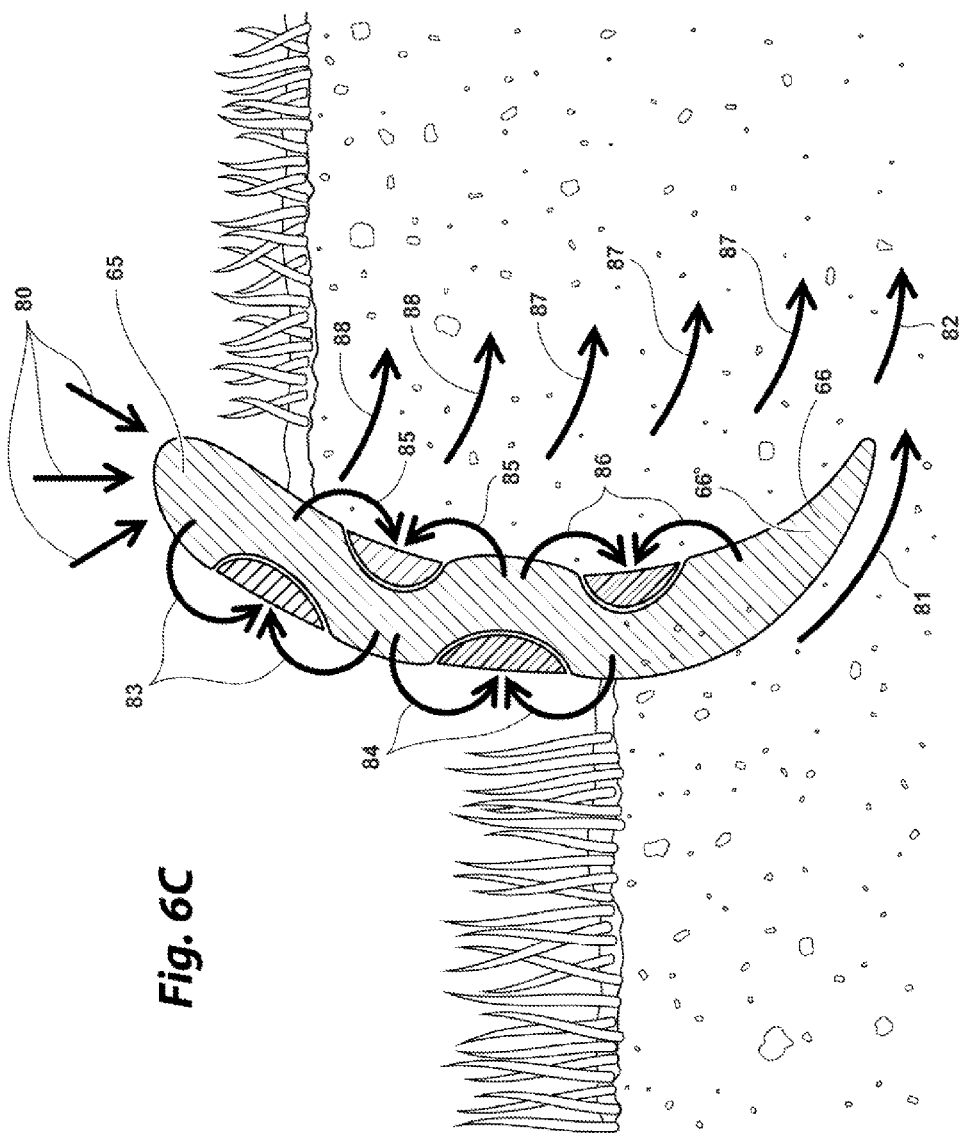

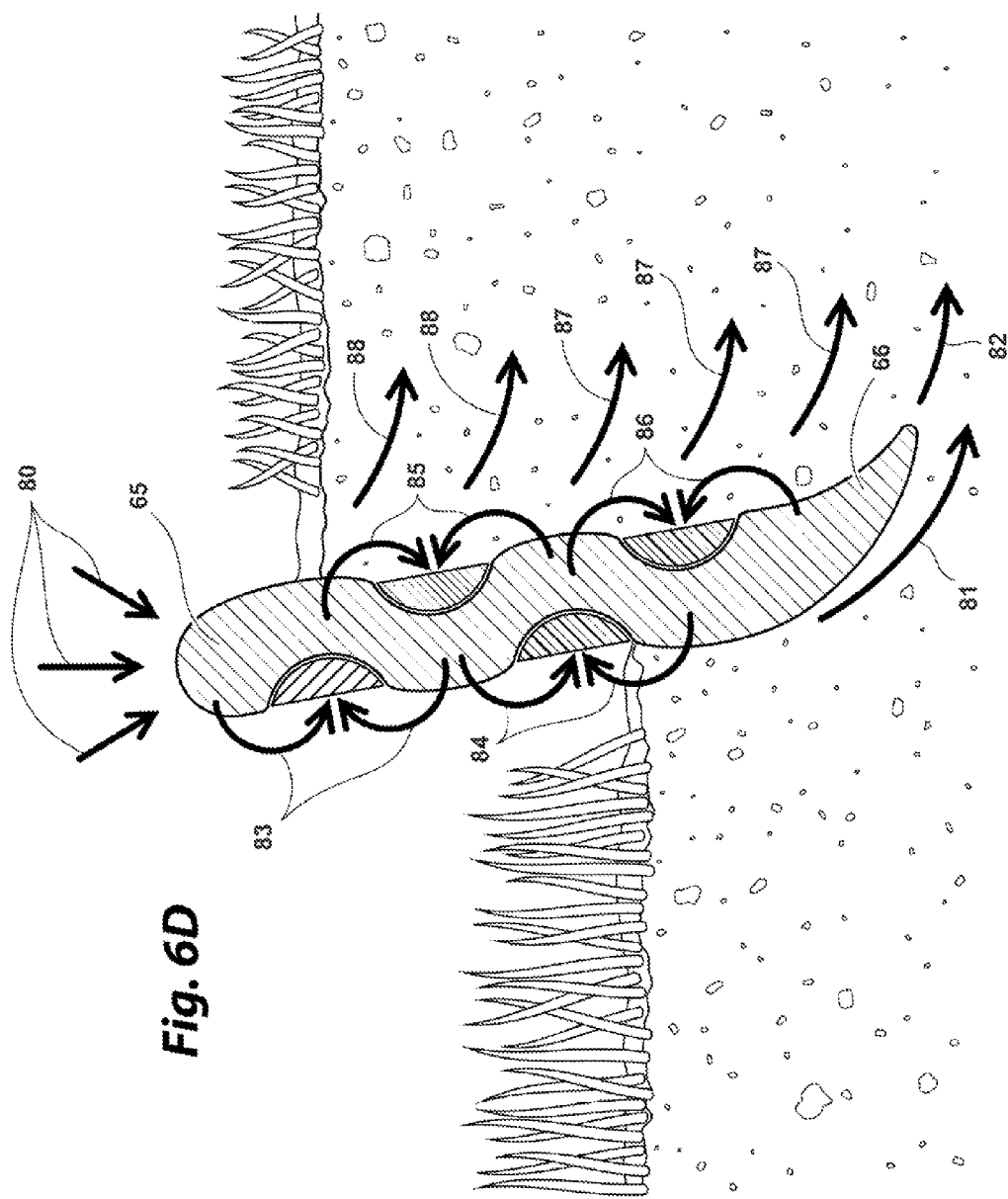

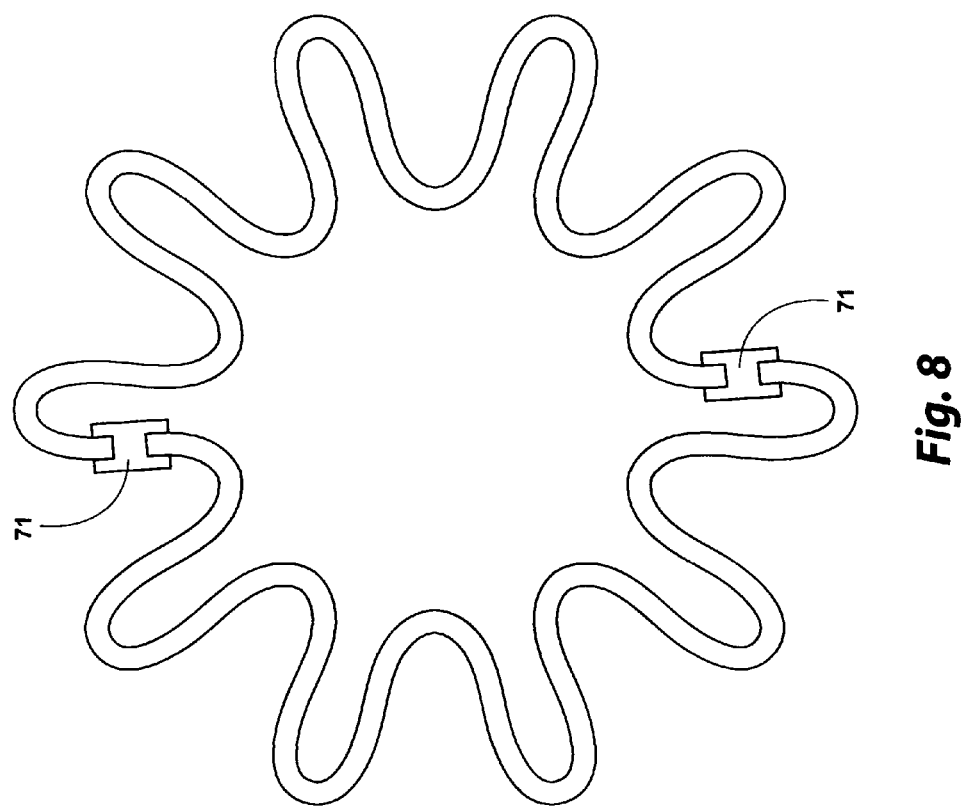

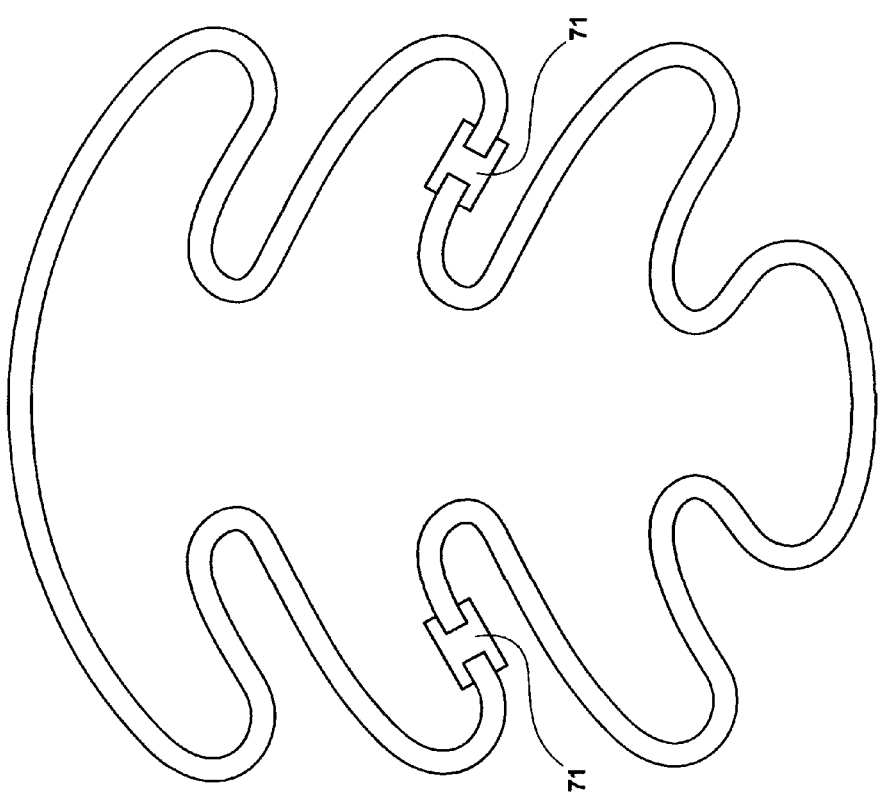

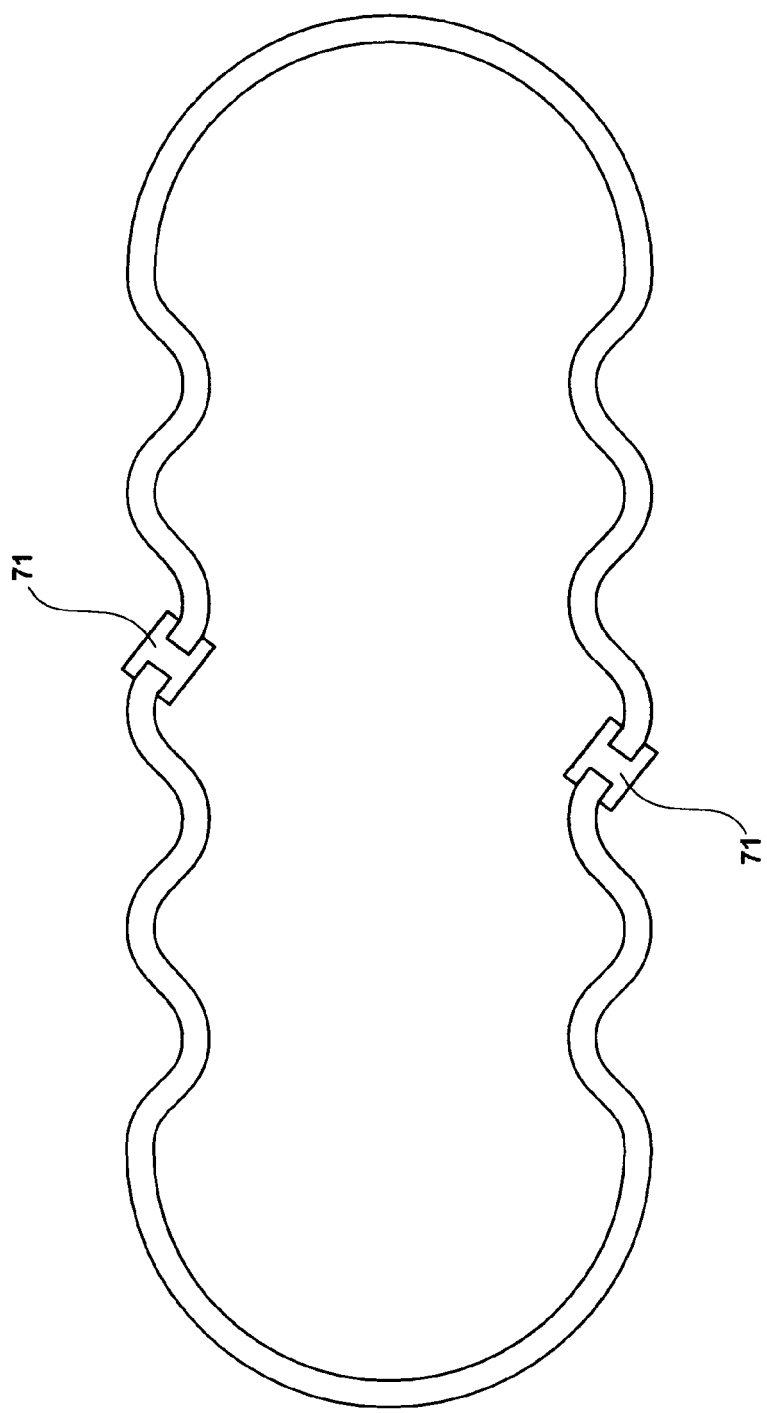

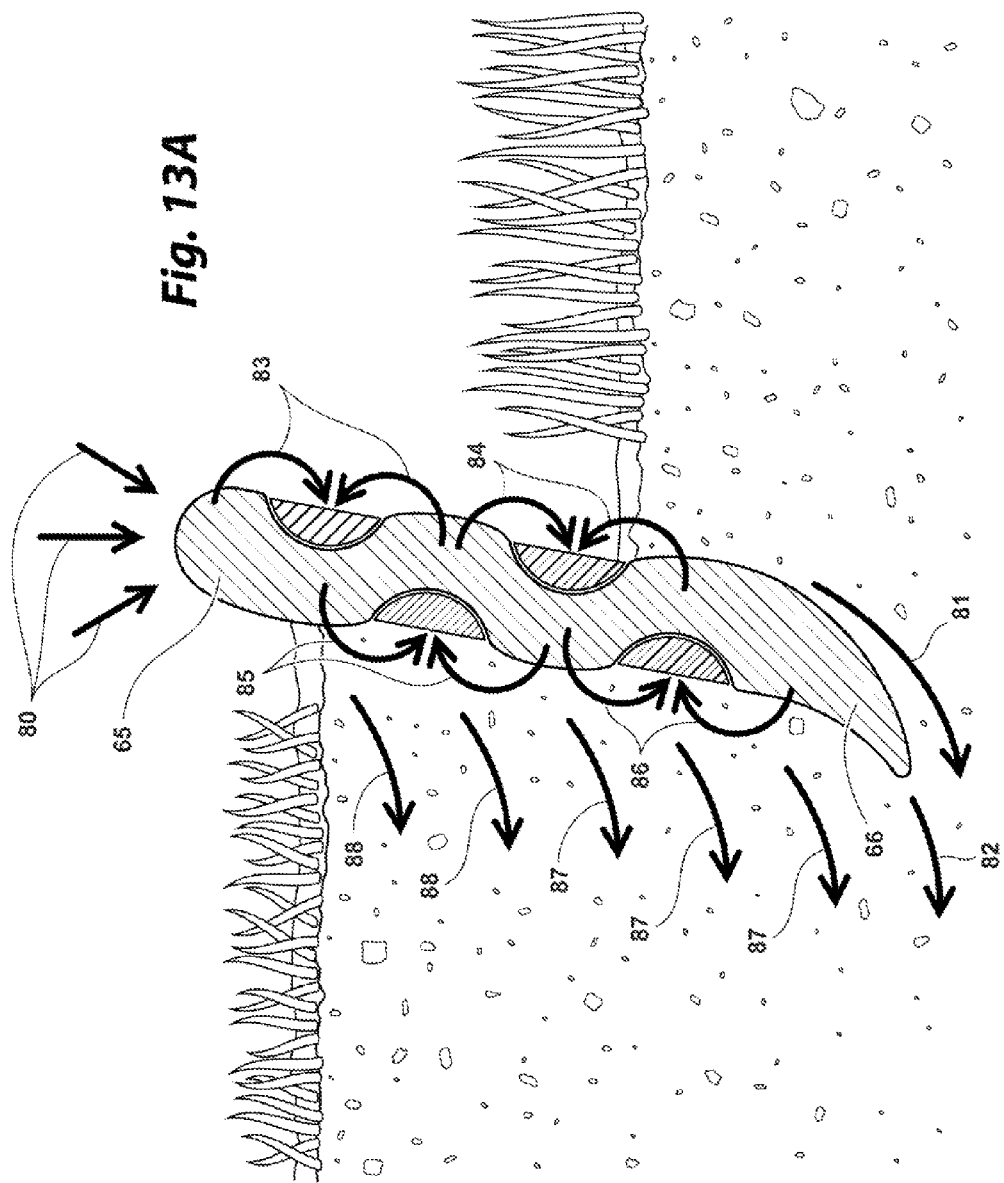

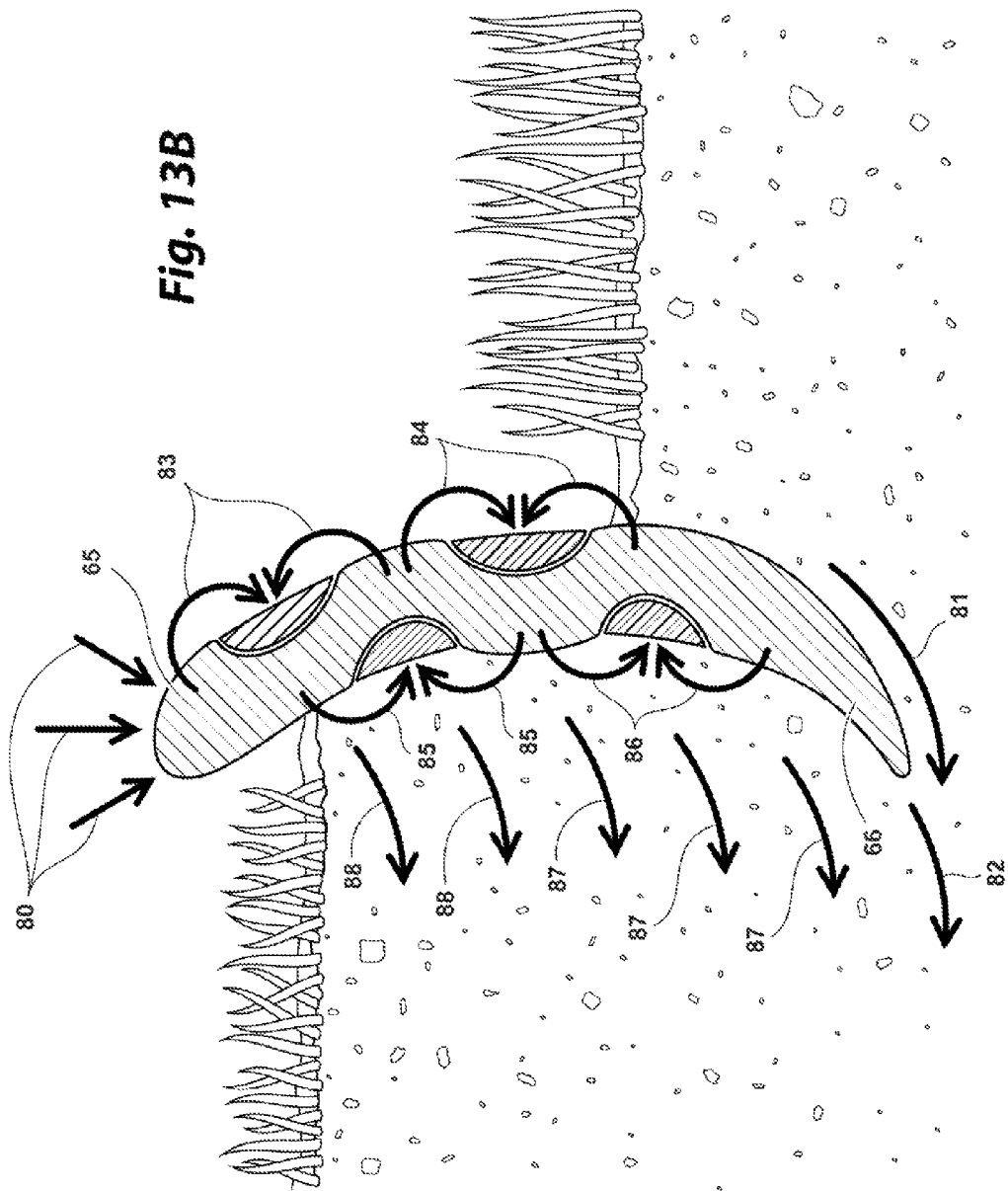

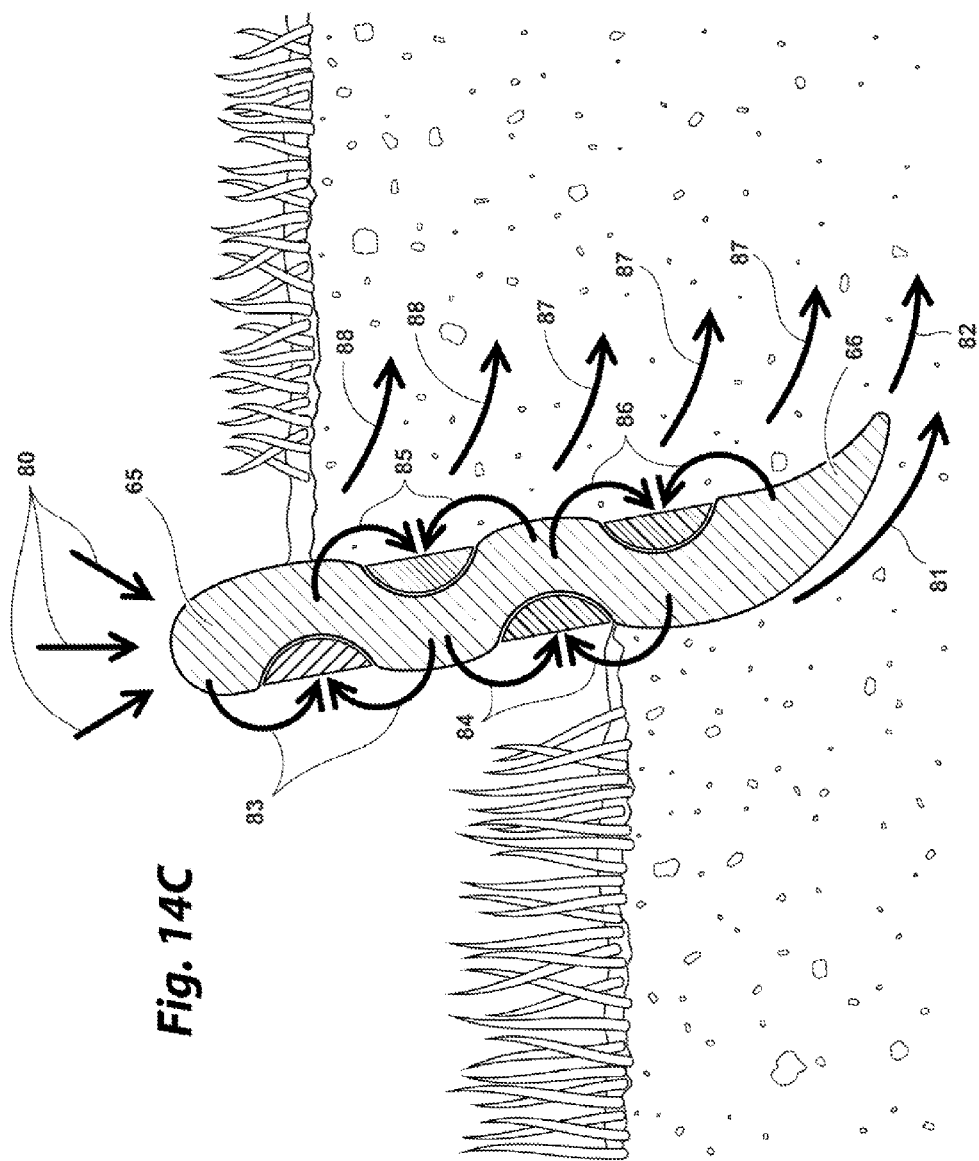

UNIQUE EXTRUSION MANUFACTURING
METHOD AND UNIQUE SOIL-PACKING
GARDEN-SHAPING SYSTEM, HAVING
ADJUSTABLE ELEVATION-GUIDING
SYSTEM, IMPACT-ABSORBING SYSTEM,
ADJUSTABLE PENETRATION-GUIDING
SYSTEM, ADJUSTABLE
BORDER-STRENGTHENING SYSTEM, AND
SHAPE-HARDENING SYSTEM

CROSS-REFERENCE TO RELATED
APPLICATIONS & CONTINUITY DATA

Provisional Patent Application No. 62/006,051 was filed on May 31, 2014.

STATEMENT REGARDING FEDERALLY
SPONSORED RESEARCH OR DEVELOPMENT

N/A

THE NAMES OF THE PARTIES TO A JOINT
RESEARCH AGREEMENT

N/A

BACKGROUND OF THE INVENTION

1. Field of the Invention

The present invention relates to a unique soil-packing garden-shaping system. Particularly, the present invention relates to a unique soil-packing garden-shaping system, having:
a) An adjustable elevation-guiding system,
b) An impact-absorbing system,
c) An adjustable penetration-guiding system,
d) An adjustable border-strengthening system, and
e) A shape-hardening system.

2. Description of Related Art Including Information Disclosed

A number of garden edging systems have been introduced.
U.S. Pat. No. 1,509,860, issued on 1924 Sep. 30, to E. H. Cannady;
U.S. Pat. No. 1,843,108, issued on 1932 Feb. 2, to F. Clayden;
U.S. Pat. No. 2,184,904, issued on 1939 Dec. 26, to J. O. Boehme;
U.S. Pat. No. 2,842,344, issued on 1958 Jul. 8, to C. Todd;
U.S. Pat. No. 3,378,949, issued on 1968 Apr. 23, to M. T. Dorris;
U.S. Pat. No. 3,387,786, issued on 1968 Jun. 11, to R. W. Rynberk;
U.S. Pat. No. 3,484,989, issued on 1969 Dec. 23, to I. I. Lazinsky;
U.S. Pat. No. 3,485,449, issued on 1969 Dec. 23, to J. L. Wilson;
U.S. Pat. No. 3,545,127, issued on 1970 Dec. 8, to H. L. Jensen;
U.S. Pat. No. 3,788,001, issued on 1974 Jan. 29, to Balfanz, Jr., Glenn F.;
U.S. Pat. No. 4,281,473, issued on 1981 Aug. 4, to Emalfarb, Mark A.;
U.S. Pat. No. 4,321,769, issued on 1982 Mar. 30, to Tisbo, Cosmo N.;
U.S. Pat. No. 4,372,079, issued on 1983 Feb. 8, to Trageser, Ann S.;
U.S. Pat. No. 4,663,883, issued on 1987 May 12, to Hilliard, Lloyd D.;
U.S. Pat. No. 4,831,776, issued on 1989 May 23, to Fritch, John R.;
U.S. Pat. No. 5,157,867, issued on 1992 Oct. 27, to Fritch, John R.;
U.S. Pat. No. 5,315,780, issued on 1994 May 31, to Thomas, James E.;
U.S. Pat. No. 5,377,447, issued on 1995 Jan. 3, to Fritch, John R.;
U.S. Pat. No. 5,379,546, issued on 1995 Jan. 10, to Popp, Richard;
U.S. Pat. No. 5,531,044, issued on 1996 Jul. 2, to Wallenius, Ronald;
U.S. Pat. No. 5,544,445, issued on 1996 Aug. 13, to Mantilla, Jose A.;
U.S. Pat. No. 6,293,046, issued on 2001 Sep. 25, to Meglino, Don A.;
U.S. Pat. No. 6,385,898, issued on 2002 May 14, to Noel, Reggie E.;
U.S. Pat. No. 6,386,517, issued on 2002 May 14, to McNeill, Kirk;
U.S. Pat. No. 6,629,383, issued on 2003 Oct. 7, to Allen, Glen;
U.S. Pat. No. 6,643,977, issued on 2003 Nov. 11, to Drysdale, Warwick;
U.S. Pat. No. 7,051,477, issued on 2006 May 30, to Burnham, Keith;
U.S. Pat. No. 7,331,147, issued on 2008 Feb. 19, to Kalisiak, Jerzy;
U.S. Pat. No. 7,526,892, issued on 2009 May 5, to Saunders, Craig M.;
U.S. Pat. No. 7,555,863, issued on 2009 Jul. 7, to Caldwell, E. Neal;
U.S. Pat. No. 7,596,903, issued on 2009 Oct. 6, to Flanagan, Michael Shane;
U.S. Pat. No. 7,669,365, issued on 2010 Mar. 2, to Olink, Stephen;
U.S. Pat. No. 7,810,277, issued on 2010 Oct. 12, to Fakhari, John;
U.S. Pat. No. 8,282,311, issued on 2012 Oct. 9, to Chow, Clark;
U.S. Pat. No. 8,354,048, issued on 2013 Jan. 15, to Caceres, Peter;
U.S. Pat. No. 8,407,948, issued on 2013 Apr. 2, to Nash, Gordon J.;
U.S. Pat. No. 8,528,249, issued on 2013 Sep. 10, to Kao, Brian W.;
U.S. Pat. No. 8,832,995, issued on 2014 Sep. 16, to Kalamaris, Stratios;
U.S. Pat. No. 8,956,139, issued on 2015 Feb. 17, to Adam, Paul;
U.S. Pat. No. D416,339, issued on 1999 Nov. 9, to Shaw, Donald;
U.S. Pat. No. D520,647, issued on 2006 May 9, to Elmore, Mark D.;
U.S. Publication No. 20050034362, issued on 2005 Feb. 17, to Anderson, Mark Carlton;
U.S. Publication No. 20050055876, issued on 2005 Mar. 17, to Solis, Herman;
U.S. Publication No. 20050252101, issued on 2005 Nov. 17, to Anderson, Mark Carlton; and U.S. Publication No. 20120174479, issued on 2012 Jul. 12, to Leiter, Gary Alan disclose a variety of inventions related to garden edging systems.

DISADVANTAGES OF THE PRIOR ART

The prior art have failed to solve many problems associated with such garden edging systems, as follows:
1) No prior art mentions or discloses any soil-packing garden-shaping system, having an adjustable elevation-guiding system. Therefore, the prior art:
   a) Require elevation-measuring tools when building and shaping garden borders,
   b) Require elevation-measuring time when building and shaping garden borders,
   c) Require measuring the depth of garden soil when building and shaping garden borders,
   d) Require measuring the depth of bark dust when building and shaping garden borders,
   e) Require measuring the depth of other bedding materials when building and shaping garden borders,
   f) Waste materials, time, labor, and money when building and shaping garden borders, and
   g) Cause personal injuries when building and shaping garden borders.
2) No prior art mentions or discloses any soil-packing garden-shaping system, having multi-flexible-material multi-color-coded built-in elevation strips. Therefore, the prior art:
   a) Are time-consuming and cumbersome to use to build garden borders at the same elevations,
   b) Are time-consuming and cumbersome to use to build garden borders at different elevations,
   c) Are time-consuming and cumbersome to use to build garden borders at even elevations,
   d) Are time-consuming and cumbersome to use to build garden borders at uneven elevations,
   e) Are time-consuming and cumbersome to use to build garden borders at the same inclinations,
   f) Are time-consuming and cumbersome to use to build garden borders at different inclinations,
   g) Are time-consuming and cumbersome to use to build garden borders at even inclinations,
   h) Are time-consuming and cumbersome to use to build garden borders at uneven inclinations,
   i) Are time-consuming and cumbersome to use to build garden borders at the same declinations,
   j) Are time-consuming and cumbersome to use to build garden borders at different declinations,
   k) Are time-consuming and cumbersome to use to build garden borders at even declinations,
   l) Are time-consuming and cumbersome to use to build garden borders at uneven declinations,
   m) Waste materials, time, labor, and money, and
   n) Cause personal injuries.
3) No prior art mentions or discloses any soil-packing garden-shaping system, having multi-flexible-material multi-color-coded built-in elevation strips. Therefore, the prior art:
   a) Do not support the flexibility of themselves,
   b) Do not allow themselves to bend to position and shape the garden borders close to one another without breaking, and
   c) Do not allow unique garden shapes (never possible before) to be built.
4) No prior art mentions or discloses any soil-packing garden-shaping system, having an impact-absorbing system. Therefore, the prior art:
   a) Do not absorb the impacts created by hammering them into the ground,
   b) Do not limit the bending degree of themselves when hammering them into the ground,
   c) Break quite often while being hammered into the ground,
   d) Waste materials, time, labor, and money, and
   e) Cause personal injuries.
5) No prior art mentions or discloses any soil-packing garden-shaping system, having an adjustable penetration-guiding system with curved directional heads. Therefore, the prior art:
   a) Do not guide themselves to penetrate into the ground at desired angles when being hammered, and
   b) Do not allow unique garden shapes (never possible before) to be built.
6) No prior art mentions or discloses any soil-packing garden-shaping system, having an adjustable border-strengthening system. Therefore, the prior art:
   a) Do not automatically pack the soil along garden borders while they are being hammered into the ground, to automatically strengthen the garden borders while building a garden,
   b) Require the needs for packing the soil along the garden borders after building the garden,
   c) Waste materials, time, labor, and money, and
   d) Cause personal injuries.
7) No prior art mentions or discloses any soil-packing garden-shaping system, having a shape-hardening system of multi-flexible-material multi-color-coded built-in elevation strips. Therefore, the prior art:
   a) Do not support the flexibility of themselves while building gardens of various shapes and sizes,
   b) Do not gradually harden over a set period of time after the garden is built to prevent themselves from returning to their original shape, and
   c) Do not secure the designed shapes and sizes of the gardens.
8) No prior art mentions or discloses any soil-packing garden-shaping system, having an adjustable elevation-guiding system (made of color-coded composite material), an impact-absorbing system (made of color-coded composite material), a shape-hardening system (made of color-coded composite material), an adjustable border-strengthening system (made of color-coded composite material), and an adjustable penetration-guiding system (made of recycled plastic and wood-fiber composite material). Therefore, the prior art:
   a) Do not have impact-absorbing capability,
   b) Do not have garden-shape-hardening capability,
   c) Do not have garden-border-strengthening capability,
   d) Do not have soil-penetration-guiding capability,
   e) Do not have border-elevation-guiding capability,
   f) Do not have strong yet flexible capability,
   g) Are not durable,
   h) Get rotten and will not last for a long time,
   i) Waste materials, time, labor, and money,
   j) Cause personal injuries, and
   k) Do not allow unique garden shapes (never possible before) to be built.

OBJECTS AND ADVANTAGES OF THE INVENTION

Prior-art garden edging systems have had many disadvantages. For example, FIG. 1 (PRIOR ART) illustrates a prior-art garden edging system being hammered into the ground. As a result, the prior-art garden edging system (having no system to absorb the hammering impact and no system to guide its elevations) will quite often break as illustrated in FIG. 2 (PRIOR ART), and will have an unsightly look of uneven elevations as illustrated in FIG. 3 (PRIOR ART). The present invention substantially departs from the conventional concepts and designs of the prior art. In doing so, the present invention provides a unique soil-packing garden-shaping system, having many unique functions and advantages, which overcome all the disadvantages of the prior art, as follows:

1) It is an object of the present invention to provide the unique soil-packing garden-shaping system, having an adjustable elevation-guiding system, which can:
    a) Eliminate the needs for elevation-measuring tools when building and shaping garden borders,
    b) Eliminate the needs for elevation-measuring time when building and shaping garden borders,
    c) Eliminate the needs for measuring the depth of garden soil when building and shaping garden borders,
    d) Eliminate the needs for measuring the depth of bark dust when building and shaping garden borders,
    e) Eliminate the needs for measuring the depth of other bedding materials when building and shaping garden borders,
    h) Save materials, time, labor, and money when building and shaping garden borders, and
    i) Prevent personal injuries when building and shaping garden borders.
2) It is another object of the present invention to provide the unique soil-packing garden-shaping system, having multi-flexible-material multi-color-coded built-in elevation strips, which can:
    a) Allow garden borders to be built quickly and easily at the same elevations,
    b) Allow garden borders to be built quickly and easily at different elevations,
    c) Allow garden borders to be built quickly and easily at even elevations,
    d) Allow garden borders to be built quickly and easily at uneven elevations,
    e) Allow garden borders to be built quickly and easily at the same inclinations,
    f) Allow garden borders to be built quickly and easily at different inclinations,
    g) Allow garden borders to be built quickly and easily at even inclinations,
    h) Allow garden borders to be built quickly and easily at uneven inclinations,
    i) Allow garden borders to be built quickly and easily at the same declinations,
    j) Allow garden borders, to be built quickly and easily at different declinations,
    k) Allow garden borders to be built quickly and easily at even declinations,
    l) Allow garden borders to be built quickly and easily at uneven declinations, and
    m) Save materials, time, labor, and money.
3) It is still another object of the present invention to provide the unique soil-packing garden-shaping system, having multi-flexible-material multi-color-coded built-in elevation strips, which can:
    a) Support the flexibility of the unique soil-packing garden-shaping system,
    b) Allow the unique soil-packing garden-shaping system to bend to position and shape the garden borders close to one another without breaking them, and
    c) Allow unique garden shapes (never possible before) to be built.
4) It is a further object of the present invention to provide the unique soil-packing garden-shaping system, having an impact-absorbing system, which can:
    a) Absorb the impacts created by hammering the unique soil-packing garden-shaping system into the ground,
    b) Limit the bending degree of the unique soil-packing garden-shaping system when hammering the unique soil-packing garden-shaping system into the ground,
    c) Prevent the unique soil-packing garden-shaping system from breaking,
    d) Save materials, time, labor, and money, and
    e) Prevent personal injuries.
5) It is an even further object of the present invention to provide the unique soil-packing garden-shaping system, having an adjustable penetration-guiding system with curved directional heads, which can:
    a) Guide the unique soil-packing garden-shaping system to penetrate into the ground at desired angles when being hammered, and
    b) Allow unique garden shapes (never possible before) to be built.
6) It is still another object of the present invention to provide the unique soil-packing garden-shaping system, having an adjustable border-strengthening system, which can:
    a) Automatically pack the soil along garden borders while the unique soil-packing garden-shaping system is being hammered into the ground, to automatically strengthen the garden borders while building a garden,
    b) Eliminate the needs for packing the soil along the garden borders after building the garden,
    c) Save materials, time, labor, and money, and
    d) Prevent personal injuries.
7) It is yet a further object of the present invention to provide the unique soil-packing garden-shaping system, having a shape-hardening system of multi-flexible-material multi-color-coded built-in elevation strips, which can:
    a) Support the flexibility of the unique soil-packing garden-shaping system while building gardens of various shapes and sizes,
    b) Gradually harden over a set period of time after the garden is built to prevent the unique soil-packing garden-shaping system from returning to its original shape, and
    c) Secure the designed shapes and sizes of the gardens.
8) It is still an even further object of the present invention to provide the unique soil-packing garden-shaping system, having an adjustable elevation-guiding system (made of color-coded composite material), an impact-absorbing system (made of color-coded composite material), a shape-hardening system (made of color-coded composite material), an adjustable border-strengthening system (made of color-coded composite material), and an adjustable penetration-guiding system (made of recycled plastic and wood-fiber composite material), all of which can:
    a) Be highly impact-absorbing,
    b) Be highly garden-shape-hardening,
    c) Be highly garden-border-strengthening,
    d) Be highly soil-penetration-guiding,
    e) Be highly border-elevation-guiding,
    f) Be highly visual,
    g) Be highly strong yet flexible,
    h) Be highly durable, i) Do not get rotten and last for a long time,
j) Save materials, time, labor, and money,
k) Prevent personal injuries, and
l) Allow unique garden shapes (never possible before) to be built.

Other objects and advantages of the present invention will become apparent from the consideration of the accompanying drawings and the ensuing description.

BRIEF SUMMARY OF THE INVENTION

A unique soil-packing garden-shaping system comprises soil-packing garden-shaping wavy partitions for absorbing hammering forces and for packing and holding garden soil, impact-absorbing-strip grooves pressure-molded on the sides of the wavy partitions, impact heads extrudedly molded to the top of the wavy partitions for receiving hammering forced thereon, curved directional heads extrudedly molded to the bottom of the wavy partitions for penetrating into the ground at adjustable angles, wavy-partition couplers for coupling the wavy partitions, and multiple different color-coded impact-absorbing strips of multiple different highly flexible materials pressure-extrudedly molded in the grooves for absorbing the hammering force exerted on the impact heads, for limiting the bending degree of the wavy partitions, for pushing the wavy partitions back after bending to prevent the wavy partitions from breaking, for guiding the elevations of the wavy partitions over garden soil, for gradually hardening to strengthen and secure the shape of the wavy partitions, and for building garden shapes, never possible before.

BRIEF DESCRIPTION OF THE SEVERAL VIEWS OF THE DRAWING(S)

FIG. 5A illustrates a cross-sectional view of the unique soil-packing garden-shaping system, being hammered into the ground.

FIGS. 5B, 5C, and 5D illustrate a cross-sectional view of the unique soil-packing garden-shaping system, absorbing the hammering force.

FIG. 6A illustrates a cross-sectional view of the unique soil-packing garden-shaping system, being hammered into the ground, in another direction.

FIGS. 6B, 6C, and 6D illustrate a cross-sectional view of the unique soil-packing garden-shaping system, absorbing the hammering force.

Figure 7A:
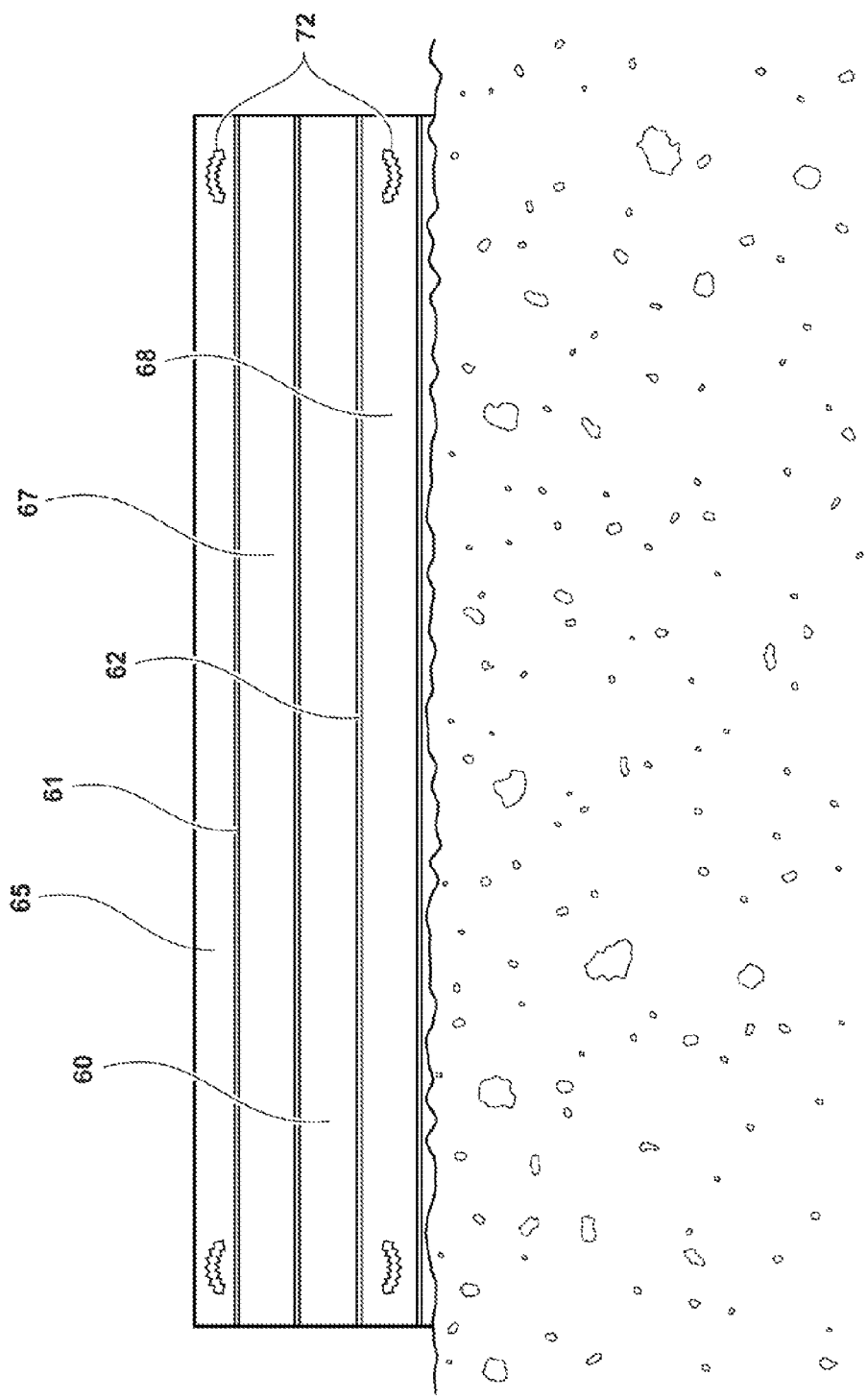

FIG. 7A illustrates a front view of a soil-packing garden-shaping partition of the unique soil-packing garden-shaping system installed in the ground at even elevations.

Figure 7B:
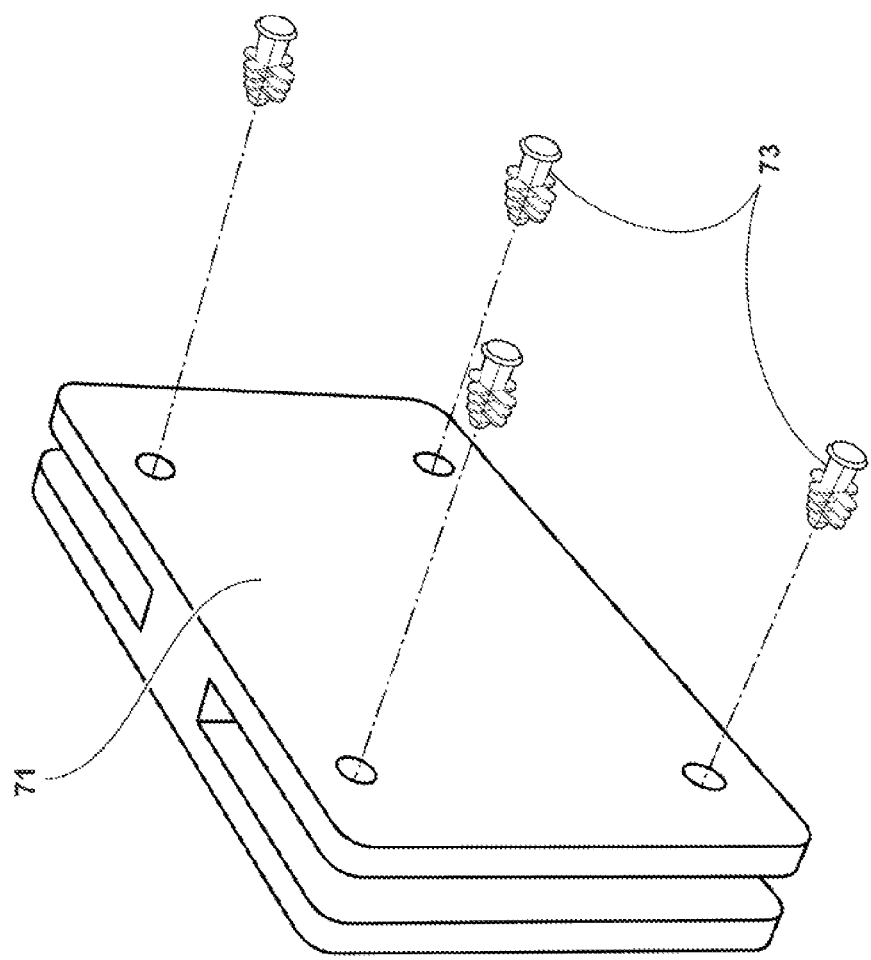

FIG. 7B illustrates a perspective view of a soil-packing-garden-shaping-partition coupler of the unique soil-packing garden-shaping system.

FIG. 8 illustrates a top view of the unique soil-packing garden-shaping system, shaping a unique garden of multiple curves without breaking.

FIG. 9 illustrates a top view of the unique soil-packing garden-shaping system, shaping another unique garden of multiple curves without breaking.

FIG. 10 illustrates a top view of the unique soil-packing garden-shaping system, shaping another unique garden of multiple curves without breaking.

Figure 11:
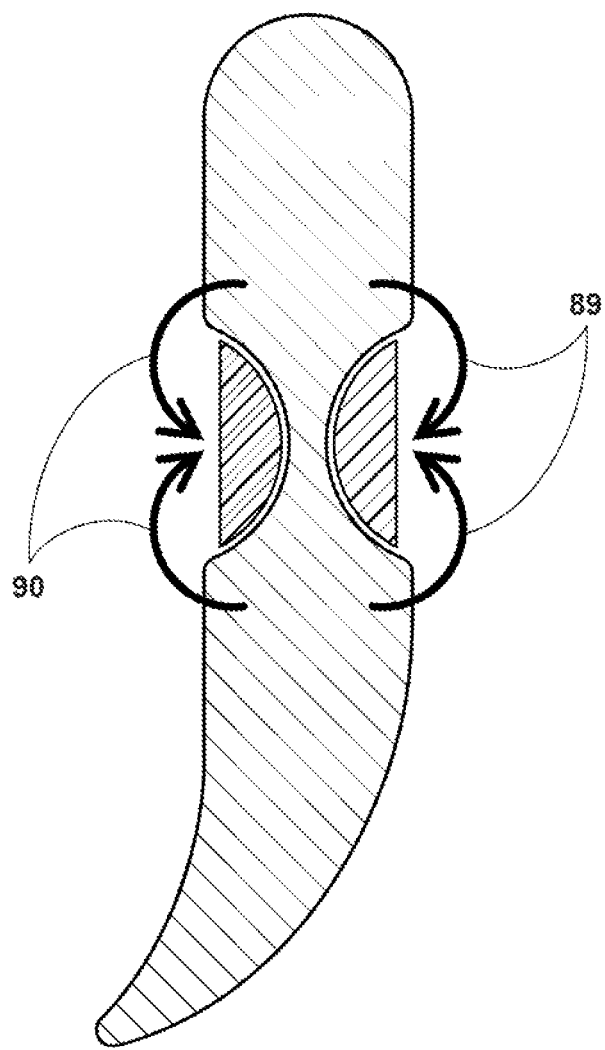

FIG. 11 illustrates a cross-sectional view of a variation of the unique soil-packing garden-shaping system.

Figure 12:
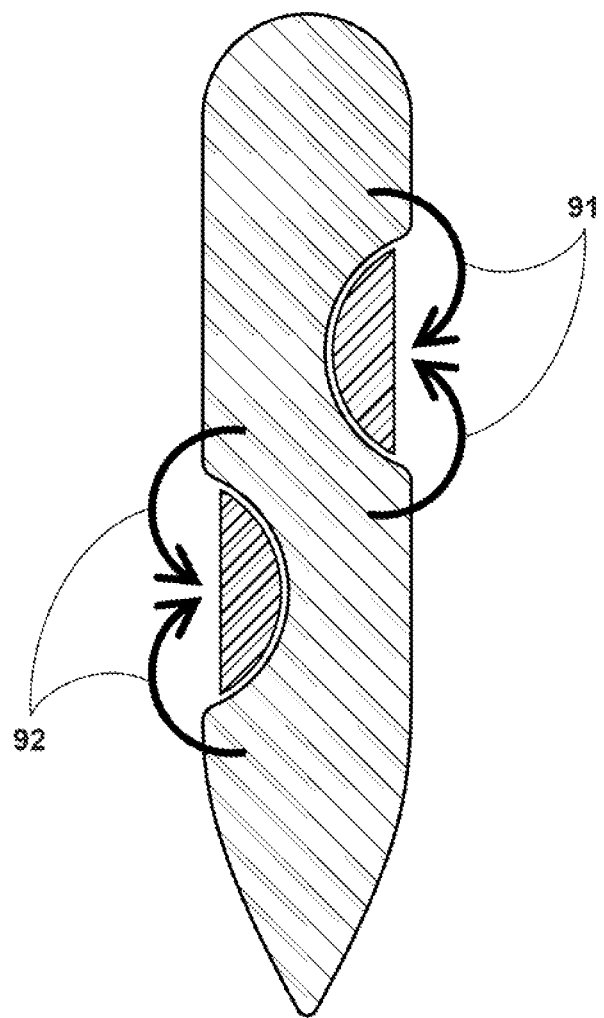

FIG. 12 illustrates a cross-sectional view of another variation of the unique soil-packing garden-shaping system.

Figure 13C:
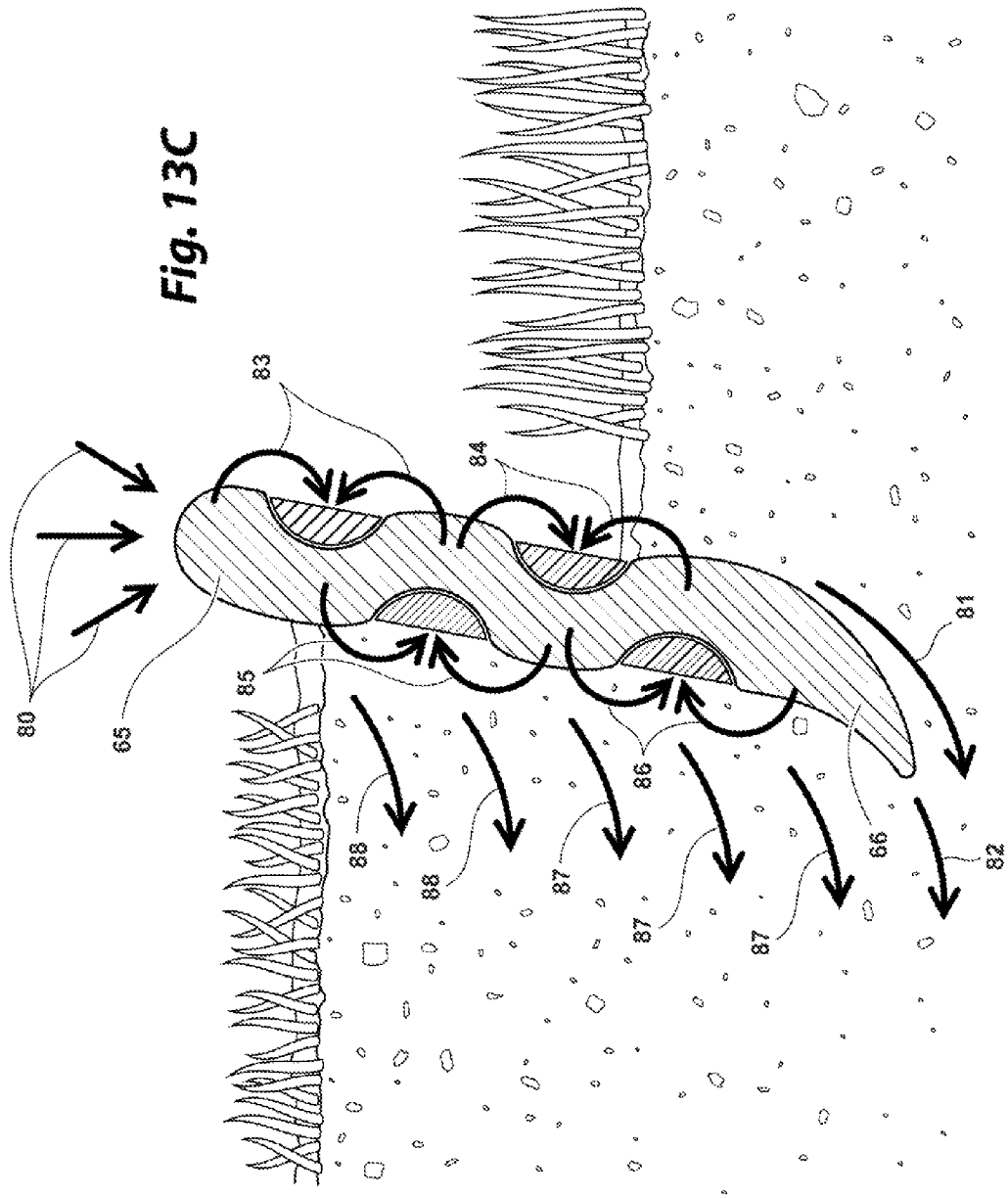

FIGS. 13A, 13B, and 13C illustrate a cross-sectional view of the unique soil-packing garden-shaping system, absorbing the hammering force.

Figure 14A:
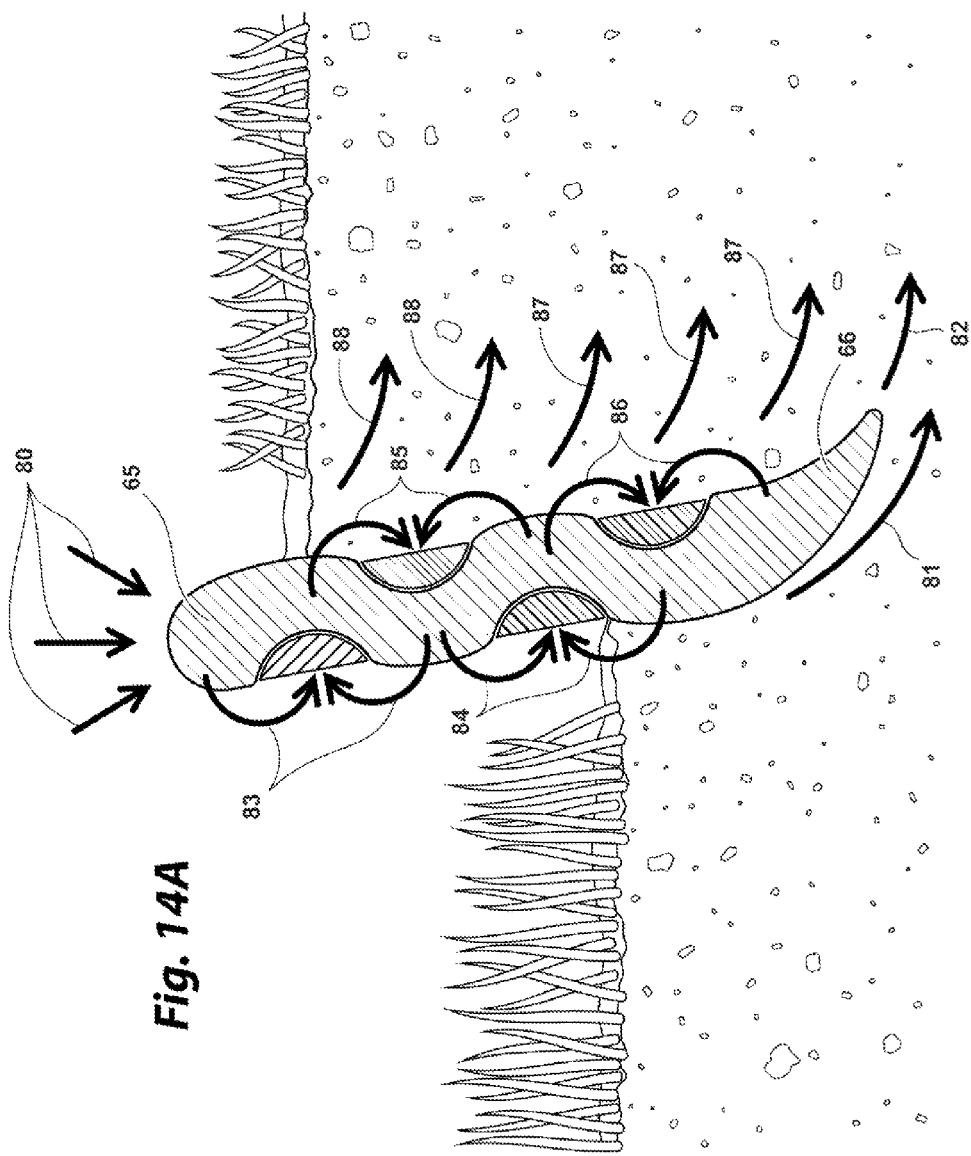
Figure 14B:
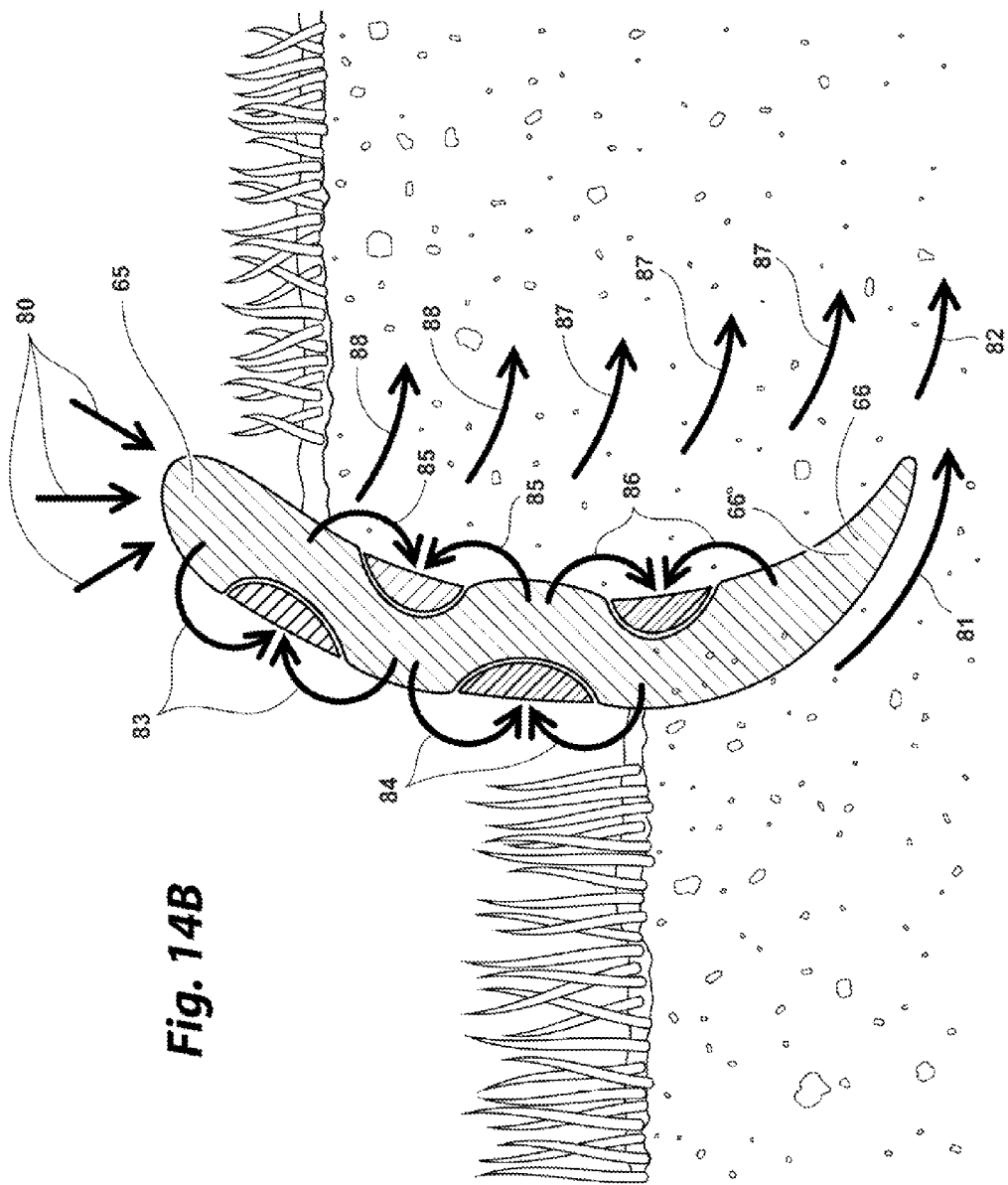

FIGS. 14A, 14B, and 14C illustrate a cross-sectional view of the unique soil-packing garden-shaping system, absorbing the hammering force.

DETAILED DESCRIPTION OF THE INVENTION

Figure 4A:
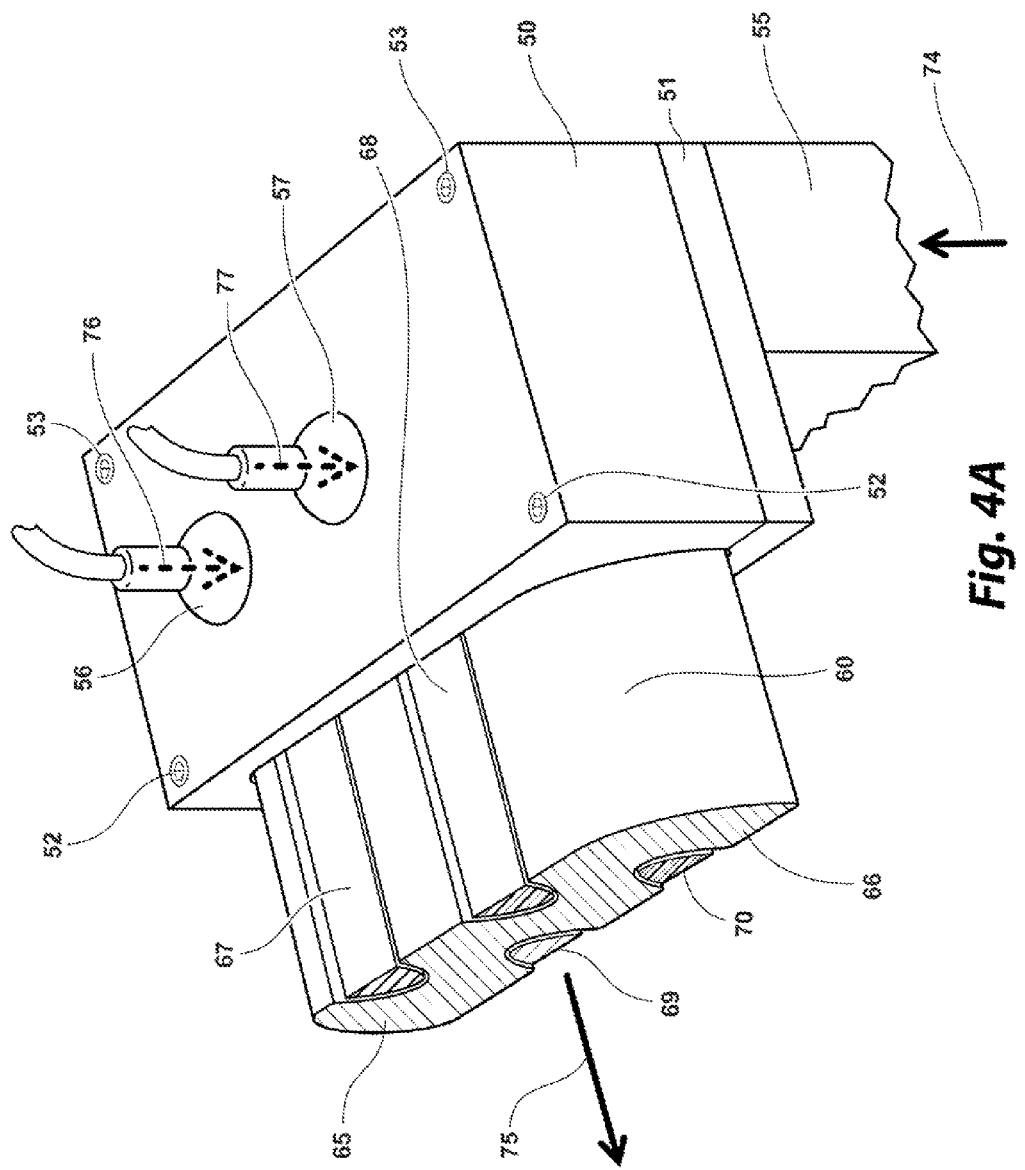
FIG. 4A illustrates a perspective view of an extrusion mold having first, second, third, and fourth nozzles for spraying first, second, third, and fourth highly-flexible color-coded composite materials, and a fifth nozzle for extruding long-lasting recycled-plastic and wood-fiber composite material, respectively.
Figure 4B:
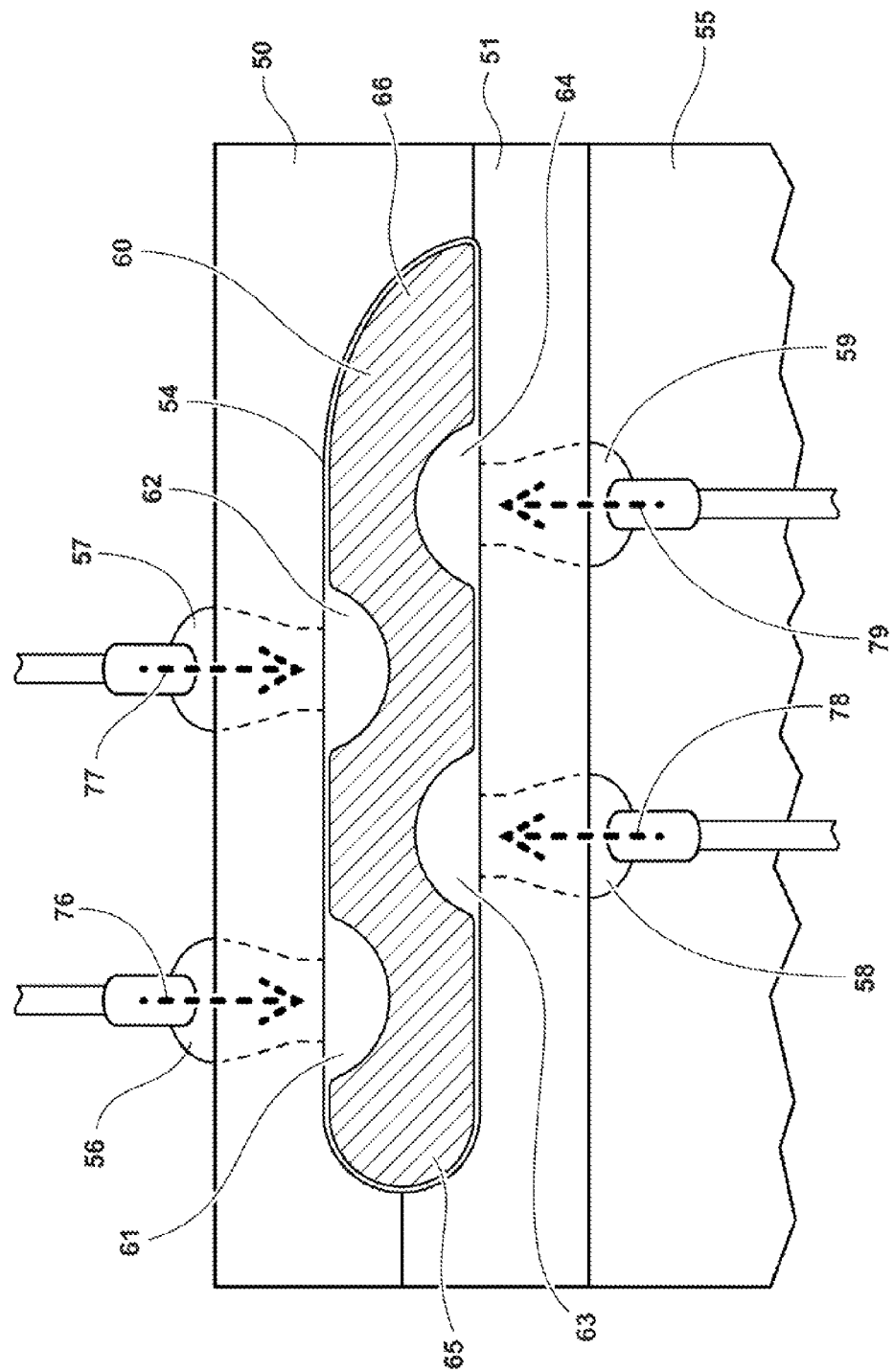
FIG. 4B illustrates a front view of an extrusion mold having first, second, third, and fourth nozzles for spraying first, second, third, and fourth highly-flexible color-coded composite materials, and a fifth nozzle for extruding long-lasting recycled-plastic and wood-fiber composite material, respectively.

Component
Referring to FIGS. 4A and 4B, the extrusion mold comprises:
  1) an extrusion-mold top 50,
  2) an extrusion-mold bottom 51,
  3) a plurality of extrusion-mold screws 52,
  4) a plurality of extrusion-mold screws 53,
  5) an extrusion-mold cavity 54,
  6) an extrusion-mold nozzle 55,
  7) a color-coded-composite pressure-spray nozzle 56,
  8) a color-coded-composite pressure-spray nozzle 57,
  9) a color-coded-composite pressure-spray nozzle 58, and
  10) a color-coded-composite pressure-spray nozzle 59.

Referring to FIGS. 5A, 5B, 5C, 5D, 6A, 6B, 6C, 6D, 7A, and 7B, the unique soil-packing garden-shaping system has:
  A built-in adjustable elevation-guiding system,
  A built-in impact-absorbing system,
  A built-in adjustable penetration-guiding system,
  A built-in adjustable border-strengthening system, and
  A built-in shape-hardening system.

The unique soil-packing garden-shaping system comprises:
  1) a plurality of soil-packing garden-shaping partitions 60,
  2) a plurality of impact-absorbing-strip grooves 61, 62, 63, and 64,
  3) a plurality of impact heads 65,
  4) a plurality of curved directional heads 66,
  5) a plurality of color-coded impact-absorbing strips 67, 68, 69, and 70,
  6) a plurality of soil-packing-garden-shaping-partition couplers 71,
  7) a plurality of partition through-holes 72, and
  8) a plurality of coupler screws 73.

Material
Referring to FIGS. 4A and 4B:
  1) Extrusion-mold top 50 is made of metallic material.
  2) Extrusion-mold bottom 51 is made of metallic material.

3) Extrusion-mold screws 52 are made of metallic material.
4) Extrusion-mold screws 53 are made of metallic material.
5) Extrusion-mold cavity 54 is made of empty space.
6) Extrusion-mold nozzle 55 is made of metallic material.
7) Color-coded-composite pressure-spray nozzle 56 is made of metallic material.
8) Color-coded-composite pressure-spray nozzle 57 is made of metallic material.
9) Color-coded-composite pressure-spray nozzle 58 is made of metallic material.
10) Color-coded-composite pressure-spray nozzle 59 is made of metallic material.

Referring to FIGS. 5A, 5B, 5C, 5D, 6A, 6B, 6C, 6D, 7A, and 7B:
1) Soil-packing garden-shaping partitions 60 are made of long-lasting recycled-plastic and wood-fiber composite material (for example, 50% plastic and 50% wood fiber composite).
2) Impact-absorbing-strip grooves 61, 62, 63, and 64 are made of empty space.
3) Impact heads 65 are made of long-lasting recycled-plastic and wood-fiber composite material.
4) Curved directional heads 66 are made of long-lasting recycled-plastic and wood-fiber composite material.
5) Color-coded impact-absorbing strips 67, 68, 69, and 70 are made of four different highly-flexible color-coded composite materials.
6) Soil-packing-garden-shaping-partition couplers 71 are made of long-lasting recycled-plastic composite material.
7) Partition through-holes 72 are made of empty space.
8) Coupler screws 73 are made of metallic material.

Shape

Referring to FIGS. 4A and 4B:
1) Extrusion-mold top 50 has a square shape and a cross-section of a J shape.
2) Extrusion-mold bottom 51 has a square shape and a cross-section of a J shape.
3) Extrusion-mold screws 52 each have an elongated shape and a cross-section of a round shape.
4) Extrusion-mold screws 53 each have an elongated shape and a cross-section of a round shape.
5) Extrusion-mold cavity 54 has a rectangular shape and a cross-section of an elongated-water-drop shape.
6) Extrusion-mold nozzle 55 has a rectangular shape and a cross-section of a rectangular shape.
7) Color-coded-composite pressure-spray nozzle 56 has an arrowhead shape and a cross-section of a round shape.
8) Color-coded-composite pressure-spray nozzle 57 has an arrowhead shape and a cross-section of a round shape.
9) Color-coded-composite pressure-spray nozzle 58 has an arrowhead shape and a cross-section of a round shape.
10) Color-coded-composite pressure-spray nozzle 59 has an arrowhead shape and a cross-section of a round shape.

Referring to FIGS. 5A, 5B, 5C, 5D, 6A, 6B, 6C, 6D, 7A, and 7B:
1) Soil-packing garden-shaping partitions 60 each have a wavy rectangular shape and a cross-section of an elongated-wavy-water-drop shape.
2) Impact-absorbing-strip grooves 61, 62, 63, and 64 each have a rectangular shape and a cross-section of a half-pie shape.
3) Impact heads 65 each have a rectangular shape and a cross-section of a half-pie shape.
4) Curved directional heads 66 each have a rectangular shape and a cross-section of a curved-arrowhead shape.
5) Color-coded impact-absorbing strips 67, 68, 69, and 70 each have a rectangular shape and a cross-section of a half-pie shape.
6) Soil-packing-garden-shaping-partition couplers 71 each have a rectangular shape and a cross-section of a letter-H shape.
7) Partition through-holes 72 each have a peanut shape.
8) Coupler screws 73 each have an elongated shape and a cross-section of a round shape.

Connection

Referring to FIGS. 4A and 4B:
1) Extrusion-mold top 50 is screwed on the inner surface of extrusion-mold bottom 51.
2) Extrusion-mold bottom 51 is screwed on the inner surface of extrusion-mold top 50.
3) Extrusion-mold screws 52 are screwed through extrusion-mold top and bottom 50 and 51.
4) Extrusion-mold screws 53 are screwed through extrusion-mold top and bottom 50 and 51.
5) Extrusion-mold cavity 54 is machined into the inner surfaces of extrusion-mold top and bottom 50 and 51.
6) Extrusion-mold nozzle 55 is screwed through extrusion-mold bottom 51 such that it engages with extrusion-mold cavity 54.
7) Color-coded-composite pressure-spray nozzle 56 is screwed through extrusion-mold top 50 such that it engages with extrusion-mold cavity 54.
8) Color-coded-composite pressure-spray nozzle 57 is screwed through extrusion-mold top 50 such that it engages with extrusion-mold cavity 54.
9) Color-coded-composite pressure-spray nozzle 58 is screwed through extrusion-mold bottom 51 such that it engages with extrusion-mold cavity 54.
10) Color-coded-composite pressure-spray nozzle 59 is screwed through extrusion-mold bottom 51 such that it engages with extrusion-mold cavity 54.

Referring to FIGS. 5A, 5B, 5C, 5D, 6A, 6B, 6C, 6D, 7A, and 7B:
1) Soil-packing garden-shaping partitions 60 are molded to impact heads 65 and curved directional heads 66, at their top and bottom edges, respectively.
2) Impact-absorbing-strip grooves 61, 62, 63, and 64 are pressure-spray-molded into the opposite surfaces of soil-packing garden-shaping partitions 60, at desired locations, respectively.
3) Impact heads 65 are molded to the top edges of soil-packing garden-shaping partitions 60, respectively.
4) Curved directional heads 66 are molded to the bottom edges of soil-packing garden-shaping partitions 60, respectively.
5) Color-coded impact-absorbing strips 67, 68, 69, and 70 are pressure-spray-molded into impact-absorbing-strip grooves 61, 62, 63, and 64, respectively.
6) Soil-packing-garden-shaping-partition couplers 71 are slid on the ends of soil-packing garden-shaping partitions 60, respectively.
7) Partition through-holes 72 are molded into the ends of soil-packing garden-shaping partitions 60, respectively.
8) Coupler screws 73 are screwed through soil-packing-garden-shaping-partition couplers 71 and partition through-holes 72, respectively.

Function

Referring to FIGS. 4A and 4B:
1) Extrusion-mold top 50 is for molding one half of each soil-packing garden-shaping partition 60.
2) Extrusion-mold bottom 51 is for molding another half of each soil-packing garden-shaping partition 60.

3) Extrusion-mold screws 52 are for coupling extrusion-mold top and bottom 50 and 51.
4) Extrusion-mold screws 53 are for coupling extrusion-mold top and bottom 50 and 51.
5) Extrusion-mold cavity 54 is for shaping each soil-packing garden-shaping partition 60.
6) Extrusion-mold nozzle 55 is for spraying liquefied long-lasting recycled-plastic and wood-fiber composite material into extrusion-mold cavity 54 to mold soil-packing garden-shaping partitions 60.
7) Color-coded-composite pressure-spray nozzle 56 is for pressure-spraying first liquefied highly-flexible color-coded composite material into soil-packing garden-shaping partitions 60, to mold impact-absorbing-strip grooves 61 and color-coded impact-absorbing strips 67 therein, respectively.
8) Color-coded-composite pressure-spray nozzle 57 is for pressure-spraying second liquefied highly-flexible color-coded composite material into soil-packing garden-shaping partitions 60, to mold impact-absorbing-strip grooves 62 and color-coded impact-absorbing strips 68 therein, respectively.
9) Color-coded-composite pressure-spray nozzle 58 is for pressure-spraying third liquefied highly-flexible color-coded composite material into soil-packing garden-shaping partitions 60, to mold impact-absorbing-strip grooves 63 and color-coded impact-absorbing strips 69 therein, respectively.
10) Color-coded-composite pressure-spray nozzle 59 is for pressure-spraying fourth liquefied highly-flexible color-coded composite material into soil-packing garden-shaping partitions 60, to mold impact-absorbing-strip grooves 64 and color-coded impact-absorbing strips 70 therein, respectively.

Referring to FIGS. 5A, 5B, 5C, 5D, 6A, 6B, 6C, 6D, 7A, and 7B:
1) Soil-packing garden-shaping partitions 60 are for:
   a) Absorbing (by using their elongated wavy shapes) the hammering forces exerted on impact heads 65, respectively,
   b) Packing (by using their elongated wavy shapes) garden soil inward to strengthen and define the borders, shape, and size of a garden, and
   c) Holding (by using their elongated wavy shapes) garden soil inward to strengthen and define the borders, shape, and size of a garden.
2) Impact-absorbing-strip grooves 61, 62, 63, and 64 are for allowing soil-packing garden-shaping partitions 60 to flex, and for housing color-coded impact-absorbing strips 67, 68, 69, and 70, respectively.
3) Impact heads 65 are for being hammered on to drive soil-packing garden-shaping partitions 60 into the ground, respectively.
4) Curved directional heads 66 are for:
   a) Guiding soil-packing garden-shaping partitions 60 into the ground in adjustable curved directions while penetrating the ground, respectively, such that soil-packing garden-shaping partitions 60 pack garden soil inward to strengthen and define the borders, shape, and size of a garden, and
   b) Guiding soil-packing garden-shaping partitions 60 into the ground in adjustable curved directions while penetrating the ground, respectively, such that soil-packing garden-shaping partitions 60 hold garden soil inward to strengthen and define the borders, shape, and size of a garden.
5) Color-coded impact-absorbing strips 67, 68, 69, and 70 are for:
   a) Guiding and indicating (by using four different colors), four different elevations above the ground of soil-packing garden-shaping partitions 60,
   b) Absorbing the impacts created by hammering on impact heads 65,
   c) Limiting the bending degrees of soil-packing garden-shaping partitions 60 to prevent them from breaking,
   d) Pushing soil-packing garden-shaping partitions 60 back to their former shapes, and
   e) Gradually hardening to strengthen soil-packing garden-shaping partitions 60 and to secure the designed shape and the designed size of the garden.
6) Soil-packing-garden-shaping-partition couplers 71 are for coupling soil-packing garden-shaping partitions 60, respectively.
7) Partition through-holes 72 are for coupler screws 73 to be screwed therethrough, respectively.
8) Coupler screws 73 are for coupling soil-packing-garden-shaping-partition couplers 71 and soil-packing garden-shaping partitions 60, respectively.

Operation

Referring to FIGS. 4A and 4B, the operation of the unique extrusion manufacturing method comprises:

(For example, first, second, third, and fourth different highly flexible color-coded impact-absorbing strips 67, 68, 69, and 70 are made of four different highly flexible color-coded composite materials having four different material properties, as follows:
   a) Color-coded impact-absorbing strips 67 is made of first liquefied highly-flexible color-coded composite material,
   b) Color-coded impact-absorbing strips 68 second liquefied highly-flexible color-coded composite material,
   c) Color-coded impact-absorbing strips 69 third liquefied highly-flexible color-coded composite material,
   d) Color-coded impact-absorbing strips 70 fourth liquefied highly-flexible color-coded composite material).

Each of the unique intersecting-infusion-and-random-infusion multi-collapsible-clamp self-centering slat systems is made of first, second, third, and fourth materials. The first material is semi-rigid, dull, and brown to absorb the heat of sun beams. The second material is semi-rigid, dull, and dark brown to absorb the heat of the sun beams. The third material is flexible, shiny, and blue to reflect the sun beams. The fourth material is flexible, shiny, and light blue to reflect the sun beams).

1) Pressure-extruding liquefied long-lasting recycled-plastic-and-wood-fiber composite material through extrusion-mold nozzle 55 into extrusion-mold cavity 54, in the direction of arrow 74, to mold soil-packing garden-shaping partition 60, in the direction of arrow 75,
2) Pressure-spraying first liquefied highly-flexible color-coded composite material through color-coded-composite pressure-spray nozzle 56 into soil-packing garden-shaping partition 60, in the direction of arrow 76, to mold one impact-absorbing-strip groove 61 and one color-coded impact-absorbing strip 67 therein,
3) Pressure-spraying second liquefied highly-flexible color-coded composite material through color-coded-composite pressure-spray nozzle 57 into soil-packing garden-shaping partition 60, in the direction of arrow 77, to mold one impact-absorbing-strip groove 62 and one color-coded impact-absorbing strip 68 therein,
4) Pressure-spraying third liquefied highly-flexible color-coded composite material through color-coded-composite pressure-spray nozzle 58 into soil-packing garden-shaping partition 60, in the direction of arrow 78, to mold one impact-absorbing-strip groove 63 and one color-coded impact-absorbing strip 69 therein, and
5) Pressure-spraying fourth liquefied highly-flexible color-coded composite material through color-coded-composite pressure-spray nozzle 59 into soil-packing garden-shaping partition 60, in the direction of arrow 79, to mold one impact-absorbing-strip groove 64 and one color-coded impact-absorbing strip 70 therein.

Referring to FIGS. 5A, 5B, 5C, 5D, 6A, 6B, 6C, 6D, 7A, and 7B, the unique soil-packing garden-shaping system has:
A built-in adjustable elevation-guiding system,
A built-in impact-absorbing system,
A built-in adjustable penetration-guiding system,
A built-in adjustable border-strengthening system, and
A built-in shape-hardening system.

The operation of the unique soil-packing garden-shaping system comprises:
1) Positioning soil-packing garden-shaping partitions 60 on the ground, and adjusting them to desired angles, to build the garden borders of a designed shape and size, respectively;
2) Hammering impact heads 65, in the directions of arrows 80 (FIG. 5A), to drive soil-packing garden-shaping partitions 60 into the ground, in the adjustable directions of arrows 81 and 82 (FIG. 5A),
   such that soil-packing garden-shaping partitions 60 partially stay above the ground at the same adjustable elevations, which are guided and indicated by color-coded impact-absorbing strips 67, 68, 69, and 70 (which are 'the adjustable elevation-guiding system'), respectively (FIGS. 5A, 6A, and 7A),
   such that color-coded impact-absorbing strips 67, 68, 69, and 70 (which are 'the impact-absorbing system'):
      a) Absorb the impacts, in the directions of arrows 83, 84, 85, and 86 (FIGS. 5B, 5C, 5D),
      b) Limit the bending degree of soil-packing garden-shaping partitions 60, in the directions of arrows 83, 84, 85, and 86, to prevent them from breaking,
   such that curved directional heads 66 (which are 'the adjustable penetration-guiding system') penetrate the ground, at adjustable angles, in the directions of arrows 81 and 82 (FIGS. 5B, 5C, 5D),
      to build the garden borders of designed shapes and sizes,
   such that soil-packing garden-shaping partitions 60 (which are 'the adjustable border-strengthening system') automatically pack the soil inward, in the directions of arrows 87 and 88 (FIGS. 5B, 5C, 5D),
      to strengthen the garden borders, and
   such that soil-packing garden-shaping partitions 60 (which are 'the adjustable border-strengthening system') automatically hold the soil inward, in the directions of arrows 87 and 88 (FIGS. 5B, 5C, 5D),
      to strengthen the garden borders;
3) Sliding soil-packing-garden-shaping-partition couplers 71 on the ends of soil-packing garden-shaping partitions 60, respectively;
4) Screwing coupler screws 73 though soil-packing-garden-shaping-partition couplers 71 and soil-packing garden-shaping partitions 60 to secure them, respectively; and
5) Leaving the unique soil-packing garden-shaping system alone over a set period of time for color-coded impact-absorbing strips 67, 68, 69, and 70 (which are 'the shape-hardening system'):
   a) To gradually harden to secure the designed shape of the garden, and
   b) To gradually harden to secure the designed size of the garden, For another example, the operation of the unique soil-packing garden-shaping system can comprise the above steps, except that soil-packing garden-shaping partitions 60 swing 180 degrees and face the opposite direction (FIGS. 6A, 6B, 6C, and 6D), to build gardens of different designed shapes and sizes.

For another example, the operation of the unique soil-packing garden-shaping system can comprise a combination of all the above steps illustrated in FIGS. 5A, 5B, 5C, 5D, 6A, 6B, 6C, and 6D, to build gardens of additional different designed shapes and sizes.

Advantage

Referring to FIGS. 5A, 5B, 5C, 5D, 6A, 6B, 6C, 6D, 7A, 7B, 8, 9, and 10:
1) The unique soil-packing garden-shaping system provides an adjustable elevation-guiding system (FIGS. 5A, 6A, and 7A), which:
   a) Eliminates the needs for elevation-measuring tools,
   b) Eliminates the needs for elevation-measuring time,
   c) Eliminates the needs for measuring the depth of garden soil,
   d) Eliminates the needs for measuring the depth of bark dust,
   e) Eliminates the needs for measuring the depth of other bedding materials,
   f) Saves materials, time, labor, and money, and
   g) Prevents personal injuries.
2) The unique soil-packing garden-shaping system provides built-in elevation strips (FIGS. 5A, 6A, and 7A), which:
   a) Allow a garden to be built quickly and easy at different elevations,
   b) Allow a garden to be built quickly and easy at even elevations,
   c) Allow a garden to be built quickly and easy at uneven elevations, and
   d) Save materials, time, labor, and money.
3) The unique soil-packing garden-shaping system provides built-in elevation strips (FIGS. 8, 9, and 10), which:
   a) Support the flexibility of the unique soil-packing garden-shaping system,
   b) Allow the unique soil-packing garden-shaping system to bend to position garden borders close to one another without breaking, and
   c) Allow unique garden shapes, never possible before, to be built.
4) The unique soil-packing garden-shaping system provides an impact-absorbing system (FIGS. 5B, 5C, 5D, 6B, 6C, and 6D), which:
   a) Absorbs the impacts created by hammering the unique soil-packing garden-shaping system into the ground,
   b) Limits the bending degree of the unique soil-packing garden-shaping system when hammering the unique soil-packing garden-shaping system into the ground, to prevent the unique soil-packing garden-shaping system from breaking,
   c) Saves materials, time, labor, and money, and
   d) Prevents personal injuries.

5) The unique soil-packing garden-shaping system provides an adjustable penetration-guiding system with curved edges (FIGS. 5B, 5C, 5D, 6B, 6C, 6D, 8, 9, and 10), which:
   a) Guide the unique soil-packing garden-shaping system to penetrate the ground at desired angles when driven therein, and
   b) Therefore, allow unique garden shapes, never possible before, to be built.
6) The unique soil-packing garden-shaping system provides an adjustable border-strengthening system (FIGS. 5A, 5B, 5C, 5D, 6A, 6B, 6C, and 6D), which:
   a) Automatically packs the soil along the garden borders while the unique soil-packing garden-shaping system is being hammered into the ground to automatically strengthen the garden borders,
   b) Eliminates the needs for packing the soil along the garden borders after building the garden,
   c) Saves materials, time, labor, and money, and
   d) Prevents personal injuries.
7) The unique soil-packing garden-shaping system provides built-in elevation strips (FIGS. 8, 9, and 10), which:
   a) Gradually harden over a set period of time after the garden is built, and
   b) Therefore, secure the designed shape of the garden.
8) The unique soil-packing garden-shaping system provides an adjustable elevation-guiding system, an impact-absorbing system, an adjustable penetration-guiding system, an adjustable border-strengthening system, and a shape-hardening system (FIGS. 8, 9, and 10), which:
   a) Are strong yet flexible,
   b) Are durable,
   c) Do not get rotten and last for a long time,
   d) Allow unique garden shapes, never possible before, to be built,
   e) Save materials, time, labor, and money, and prevent personal injuries.

Variation

Referring to FIGS. 4A and 4B:
1) Extrusion-mold top 50 can be any shape and size.
2) Extrusion-mold bottom 51 can be any shape and size.
3) Extrusion-mold screws 52 each can be any shape and size.
4) Extrusion-mold screws 53 each can be any shape and size.
5) Extrusion-mold cavity 54 can be any shape and size.
6) Extrusion-mold nozzle 55 can be any shape and size.
7) Color-coded-composite pressure-spray nozzle 56 can be any shape and size.
8) Color-coded-composite pressure-spray nozzle 57 can be any shape and size.
9) Color-coded-composite pressure-spray nozzle 58 can be any shape and size.
10) Color-coded-composite pressure-spray nozzle 59 can be any shape and size.

The extrusion mold can have at least one color-coded-composite pressure-spray nozzle.

Referring to FIGS. 11 and 12:
1) Soil-packing garden-shaping partitions 60 each can be any shape and size.
   For example, soil-packing garden-shaping partitions 60 each can have at least one groove molded therein for housing at least one color-coded impact-absorbing strip (FIGS. 11 and 12). For another example, a soil-packing garden-shaping partition, equivalent to soil-packing garden-shaping partition 60, can perform all its functions, such as aborbing the hammering impacts (in the direction of arrows 89, 90, 91, and 92 in FIGS. 11 and 12, respectively).
2) Impact-absorbing-strip grooves 61, 62, 63, and 64 each can be any shape and size.
3) Impact heads 65 each can be any shape and size.
4) Curved directional heads 66 each can be any shape and size. For example, a directional head can be symmetrical and have an angle of 30 degree, 45 degree, 60 degree, or any degree.
5) Color-coded impact-absorbing strips 67, 68, 69, and 70 each can be any shape and size.
6) Soil-packing-garden-shaping-partition couplers 71 each can be any shape and size.
7) Partition through-holes 72 each can be any shape and size.
8) Coupler screws 73 each can be any shape and size.
9) As illustrated in FIGS. 5A, 5B, 5C, 5D, 6A, 6B, 6C, and 6D above, referring to FIGS. 13A, 13B, 13C, 14A, 14B, and 14C, the unique soil-packing garden-shaping system can absorb the hammering force in any directions and angles to prevent itself from breaking, can penetrate the soil in any directions and angles, can pack and hold garden soil in any directions and angles, can gradually harden after any set period of time to secure the designed shapes and sizes of gardens, and can guide and indicate multiple different elevations, inclinations, and declinations for quick, easy, and accurate installation of the unique soil-packing garden-shaping system on even, uneven, and slanted garden ground.

MAJOR ADVANTAGES OF THE INVENTION

Figures 1, 2:
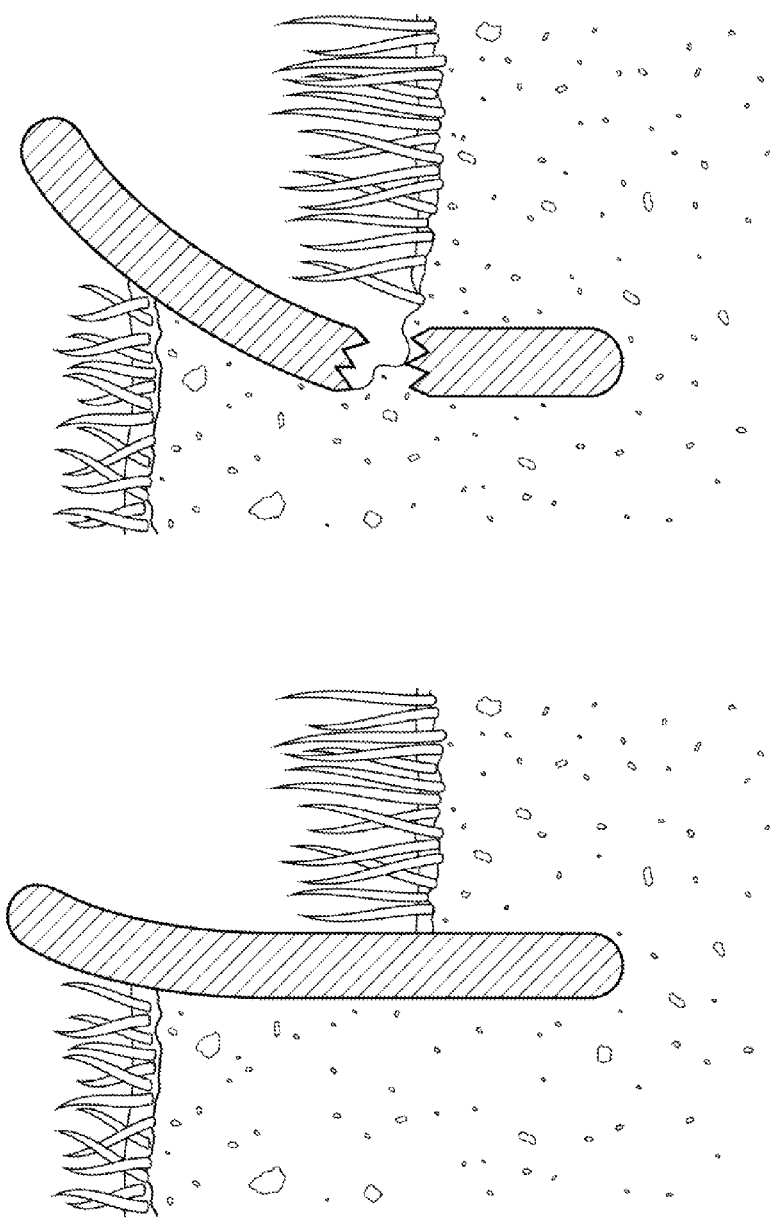
FIG. 1 (PRIOR ART) illustrates a cross-sectional view of a prior-art garden border, bent while being hammered into the ground.
FIG. 2 (PRIOR ART) illustrates a cross-sectional view of a prior-art garden border, broken while being hammered into the ground.
Figure 3:
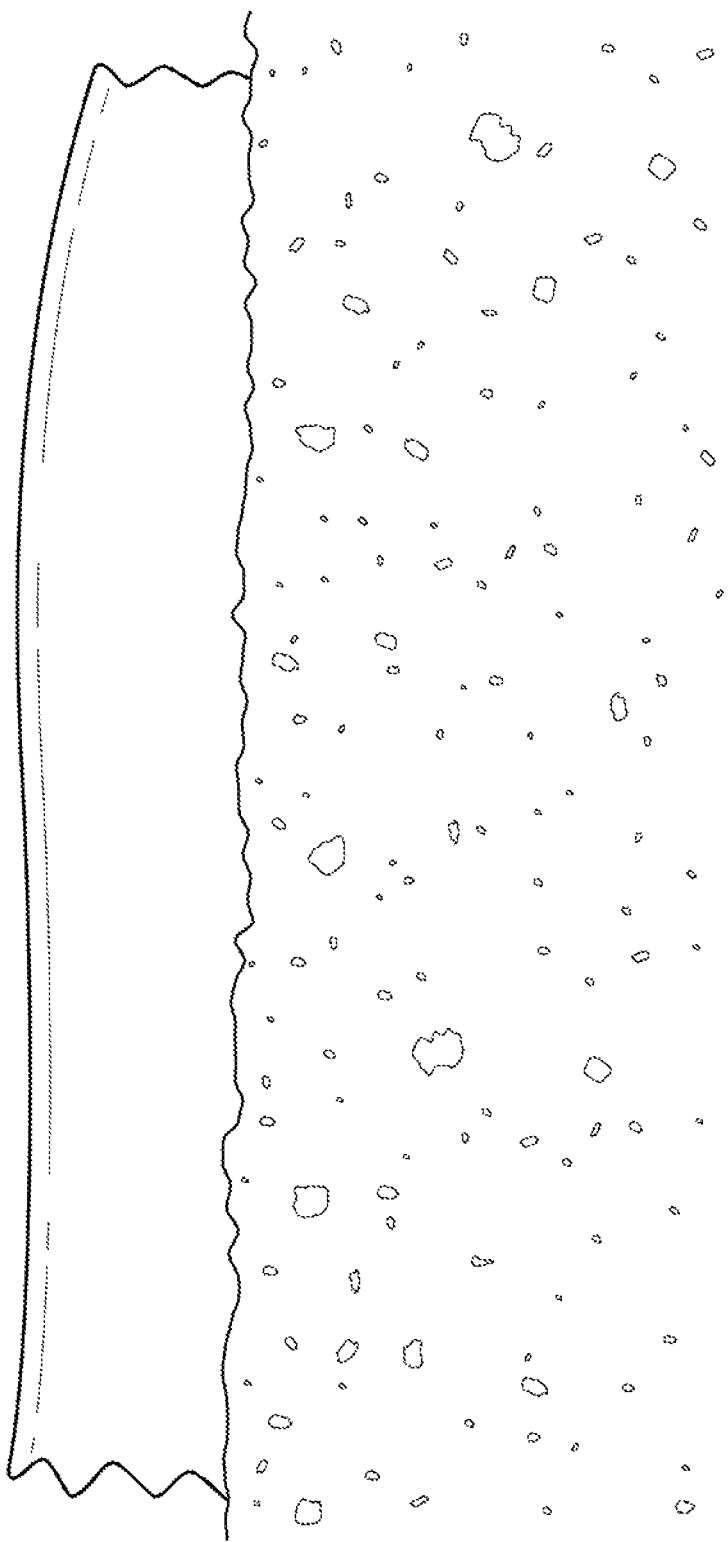
FIG. 3 (PRIOR ART) illustrates a front view of a prior-art garden partition installed in the ground at uneven elevations.

Prior-art garden partitions have had many disadvantages. For example, FIG. 1 (PRIOR ART) illustrates a prior-art garden partition being hammered into the ground. As a result, the prior-art garden partition (having no system to absorb the hammering impact and no system to guide its elevations) will quite often break as illustrated in FIG. 2 (PRIOR ART), and will have an unsightly look of uneven elevations as illustrated in FIG. 3 (PRIOR ART). The present invention substantially departs from the conventional concepts and designs of the prior art. In doing so, the present invention provides the unique soil-packing garden-shaping system, having many unique functions and advantages, which overcome all the disadvantages of the prior art, as follows:
1) It is an object of the present invention to provide the unique soil-packing garden-shaping system, having an adjustable elevation-guiding system (FIGS. 5A, 6A, and 7A), which can:
   a) Eliminate the needs for elevation-measuring tools when building and shaping garden borders,
   b) Eliminate the needs for elevation-measuring time when building and shaping garden borders, and
   c) Eliminate the needs for measuring the depth of garden soil,
   d) Eliminate the needs for measuring the depth of bark dust,
   e) Eliminate the needs for measuring the depth of other bedding materials when building and shaping garden borders,
   f) Save materials, time, labor, and money, and
   g) Prevent personal injuries.
2) It is another object of the present invention to provide the unique soil-packing garden-shaping system, having built-in elevation strips (FIGS. 5A, 6A, and 7A), which can:

a) Allow garden borders to be built quickly and easily at the same elevations,
b) Allow garden borders to be built quickly and easily at different elevations,
c) Allow garden borders to be built quickly and easily at even elevations,
d) Allow garden borders to be built quickly and easily at uneven elevations,
e) Allow garden borders to be built quickly and easily at the same inclinations,
f) Allow garden borders to be built quickly and easily at different inclinations,
g) Allow garden borders to be built quickly and easily at even inclinations,
h) Allow garden borders to be built quickly and easily at uneven inclinations,
i) Allow garden borders to be built quickly and easily at the same declinations,
j) Allow garden borders to be built quickly and easily at different declinations,
k) Allow garden borders to be built quickly and easily at even declinations,
l) Allow garden borders to be built quickly and easily at uneven declinations, and
m) Save materials, time, labor, and money.
3) It is still another object of the present invention to provide the unique soil-packing garden-shaping system, having built-in elevation strips (FIGS. 8, 9, and 10), which can:
a) Support the flexibility of the unique soil-packing garden-shaping system,
b) Allow the unique soil-packing garden-shaping system to bend to position and shape the garden borders close to one another without breaking them, and
c) Allow unique garden shapes (never possible before) to be built.
4) It is a further object of the present invention to provide the unique soil-packing garden-shaping system, having an impact-absorbing system (FIGS. 5B 5C, 5D, 6B, 6C, and 6D), which can:
a) Absorb the impacts created by hammering the unique soil-packing garden-shaping system into the ground,
b) Limit the bending degree of the unique soil-packing garden-shaping system when hammering the unique soil-packing garden-shaping system into the ground,
c) Prevent the unique soil-packing garden-shaping system from breaking,
d) Save materials, time, labor, and money, and
e) Prevent personal injuries.
5) It is an even further object of the present invention to provide the unique soil-packing garden-shaping system, having an adjustable penetration-guiding system with curved directional heads (FIGS. 5B, 5C, 5D, 6B, 6C, 6D, 8, 9, and 10), which can:
a) Guide the unique soil-packing garden-shaping system to penetrate into the ground at desired angles when being hammered, and
b) Allow unique garden shapes (never possible before) to be built.
6) It is still another object of the present invention to provide the unique soil-packing garden-shaping system, having an adjustable border-strengthening system (FIGS. 5A, 5B, 5C, 5D, 6A, 6B, 6C, and 6D), which can:
a) Automatically pack the soil along garden borders while the unique soil-packing garden-shaping system is being hammered into the ground, to automatically strengthen the garden borders while building a garden,
b) Eliminate the needs for packing the soil along the garden borders after building the garden,
c) Save materials, time, labor, and money, and
d) Prevent personal injuries.
7) It is yet a further object of the present invention to provide the unique soil-packing garden-shaping system, having a shape-hardening system of built-in elevation strips (FIGS. 8, 9, and 10), which can:
a) Support the flexibility of the unique soil-packing garden-shaping system while building gardens of various shapes and sizes,
b) Gradually harden over a set period of time after the garden is built to prevent the unique soil-packing garden-shaping system from returning to its original shape, and
c) Secure the designed shapes and sizes of the gardens.
8) It is still an even further object of the present invention to provide the unique soil-packing garden-shaping system, having an adjustable elevation-guiding system (made of color-coded composite material), an impact-absorbing system (made of color-coded composite material), a shape-hardening system (made of color-coded composite material), an adjustable border-strengthening system (made of color-coded composite material), and an adjustable penetration-guiding system (made of recycled plastic and wood-fiber composite material) (FIGS. 8, 9, and 10), all of which can:
a) Be highly impact-absorbing,
b) Be highly garden-shape-hardening,
c) Be highly garden-border-strengthening,
d) Be highly soil-penetration-guiding,
e) Be highly border-elevation-guiding,
f) Be highly visual,
g) Be highly strong yet flexible,
h) Be highly durable,
i) Do not get rotten and last for a long time,
j) Save materials, time, labor, and money,
k) Prevent personal injuries, and
l) Allow unique garden shapes (never possible before) to be built.

What is claimed is:
1. A garden-partition system for absorbing impact, guiding elevation, guiding inclination, guiding declination, packing soil, and becoming hardened comprising:
a plurality of soil-packing garden-shaping partitions, each of said soil-packing garden-shaping partitions having a top edge, a bottom edge, first partition side, second partition side, first partition end, second partition end, a plurality of impact-absorbing grooves molded on said first or said second partition side, an impact head molded to said top edge, a directional head molded to said bottom edge, a plurality of first partition through-holes, and a plurality of second partition through-holes, said first partition through-holes molded in said first partition end, said second partition through-holes molded in said second partition end;
a plurality of impact-absorbing strips, each of said impact-absorbing strips extrudedly and pressurizedly molded in one of said impact-absorbing grooves
for indicating elevation of said soil-packing garden-shaping partitions,
absorbing hammering force exerted on said impact heads to drive said directional heads into the ground to pack the ground,
limiting bending degree of said soil-packing garden-shaping partitions, pushing said hammering force back to prevent said soil-packing garden-shaping partitions from breaking, and becoming hardened to strengthen said soil-packing garden-shaping partitions;

a plurality of partition couplers, each of said partition couplers having a plurality of first coupler holes, a plurality of second coupler holes, first coupler end, second coupler end, first coupler recess, and second coupler recess, said first coupler holes molded in said first coupler end, said first coupler recess molded in said first coupler end, said second coupler holes molded in said second coupler end, said second coupler recess molded in said second coupler end, said first and said second coupler recesses for said first and said second partition ends to be slid therein respectively; and a plurality of coupler screws for screwing through said first and said second coupler holes and through said first and said second partition through-holes to couple said partition couplers and said soil-packing garden-shaping partitions.

2. The garden-partition system of claim 1, wherein, said impact-absorbing strips are made of four different flexible materials, respectively.

3. The garden-partition system of claim 1, wherein, said impact-absorbing strips have four different colors, respectively.

4. The garden-partition system of claim 1, wherein, said soil-packing garden-shaping partitions, said impact heads, and said directional heads are made of a long-lasting recycled-plastic-and-wood-fiber composite material.

5. The garden-partition system of claim 1, wherein, said partition couplers are made of plastic-composite material.

6. A garden-partition system for absorbing impact and guiding elevation comprising:

a plurality of soil-packing garden-shaping partitions, each of said soil-packing garden-shaping partitions having a top edge, a bottom edge, first partition side, second partition side, first partition end, second partition end, at least one impact-absorbing groove molded on said first or said second partition side, an impact head molded to said top edge, a directional head molded to said bottom edge, a plurality of first partition through-holes, and a plurality of second partition through-holes, said first partition through-holes molded in said first partition end, said second partition through-holes molded in said second partition end;

at least one impact-absorbing strip, each of said at least one impact-absorbing strip molded in one of said at least one impact-absorbing groove for indicating elevation of said soil-packing garden-shaping partitions, absorbing hammering force exerted on said impact heads, limiting bending degree of said soil-packing garden-shaping partitions, pushing said hammering force back, and becoming hardened;

a plurality of partition couplers, each of said partition couplers having a plurality of first coupler holes, a plurality of second coupler holes, first coupler end, second coupler end, first coupler recess, and second coupler recess, said first coupler holes and said first coupler recess molded in said first coupler end, said second coupler holes and said second coupler recess molded in said second coupler end, said first and said second coupler recesses for said first and said second partition ends to be slid therein respectively; and a plurality of coupler screws for screwing through said first and said second coupler holes and through said first and said second partition through-holes to couple said partition couplers and said soil-packing garden-shaping partitions.

7. The garden-partition system of claim 6, wherein, said at least one impact-absorbing strip is made of four different flexible materials, respectively.

8. The garden-partition system of claim 6, wherein, said at least one impact-absorbing strip has four different colors, respectively.

9. The garden-partition system of claim 6, wherein, said soil-packing garden-shaping partitions, said impact heads, and said directional heads are made of a long-lasting recycled-plastic-and-wood-fiber composite material.

10. The garden-partition system of claim 6, wherein, said partition couplers are made of plastic-composite material.

* * * * *